United States Patent
Laberge et al.

(10) Patent No.: US 6,941,035 B2
(45) Date of Patent: Sep. 6, 2005

(54) OPTICAL CROSS-CONNECT SWITCH

(75) Inventors: Michel Laberge, Bowen Island (CA); Thomas W. Steiner, Burnaby (CA); Valentin Karasyuk, Burnaby (CA)

(73) Assignee: Creo SRL, Burnaby (CA)

( * ) Notice: Subject to any disclaimer, the term of this patent is extended or adjusted under 35 U.S.C. 154(b) by 0 days.

(21) Appl. No.: 10/692,848

(22) Filed: Oct. 27, 2003

(65) Prior Publication Data

US 2004/0129871 A1 Jul. 8, 2004

Related U.S. Application Data

(63) Continuation of application No. PCT/CA02/00596, filed on Apr. 25, 2002, and a continuation-in-part of application No. 09/842,225, filed on Apr. 26, 2001, now Pat. No. 6,763,160, and a continuation-in-part of application No. 09/842,031, filed on Apr. 26, 2001.

(51) Int. Cl.[7] ................................................. G02B 6/26
(52) U.S. Cl. .............................. 385/17; 385/48; 385/52
(58) Field of Search ............................ 385/17, 16, 18, 385/14, 24, 25, 27, 39, 48, 52

(56) References Cited

U.S. PATENT DOCUMENTS

| | | | |
|---|---|---|---|
| 4,120,583 A | 10/1978 | Hyatt | |
| 4,172,994 A | 10/1979 | Bergkvist | |
| 4,265,534 A | 5/1981 | Remijan | |
| 4,333,009 A | * 6/1982 | Stevens | ................... 250/237 G |
| 4,429,267 A | * 1/1984 | Veale | ......................... 318/594 |
| 4,596,925 A | 6/1986 | Gilby | |
| 4,762,391 A | 8/1988 | Margolin | |
| 4,775,788 A | 10/1988 | Harshberger, Jr. et al. | |
| 4,831,252 A | 5/1989 | Ihnat et al. | |
| 4,841,142 A | 6/1989 | Waszkiewicz | |
| 5,053,685 A | 10/1991 | Bacchi | |
| 5,175,601 A | 12/1992 | Fitts | |
| 5,177,348 A | 1/1993 | Laor | |
| 5,206,497 A | 4/1993 | Lee | |
| 5,459,578 A | 10/1995 | Park et al. | |
| 5,524,153 A | 6/1996 | Laor | |
| 6,005,998 A | 12/1999 | Lee | |
| 6,087,655 A | * 7/2000 | Kobrin | ................... 250/237 G |
| 6,097,858 A | 8/2000 | Laor | |
| 6,097,860 A | 8/2000 | Laor | |
| 6,101,299 A | 8/2000 | Laor | |
| 6,133,986 A | * 10/2000 | Johnson | ....................... 355/67 |
| 6,498,685 B1 | 12/2002 | Johnson | |

FOREIGN PATENT DOCUMENTS

| | | |
|---|---|---|
| EP | 0729050 | 8/1996 |
| EP | 0751415 | 1/1997 |
| EP | 0844502 | 5/1998 |
| EP | 0846969 | 6/1998 |

* cited by examiner

Primary Examiner—Kianni C. Kaveh
(74) Attorney, Agent, or Firm—Oyen Wiggs Green & Mutala

(57) ABSTRACT

An optical cross-connect switch is disclosed for switching optical communication signals between any of a plurality of input optical channels and any of a plurality of output optical channels. The switch comprises a first pattern projector configured to project one or more first control signal radiation patterns and a plurality of output encoders. Each output encoder is associated with one of the plurality of output optical channels. Each output encoder is positioned, relative to its associated output optical channel and the first pattern projector, to receive the first control signal radiation patterns and to detect at least a portion of one or more corresponding output Moiré interference patterns produced by the control signal radiation patterns. Each output encoder is configured to generate a corresponding output control signal indicative of an intensity of detected output Moiré interference patterns.

46 Claims, 22 Drawing Sheets

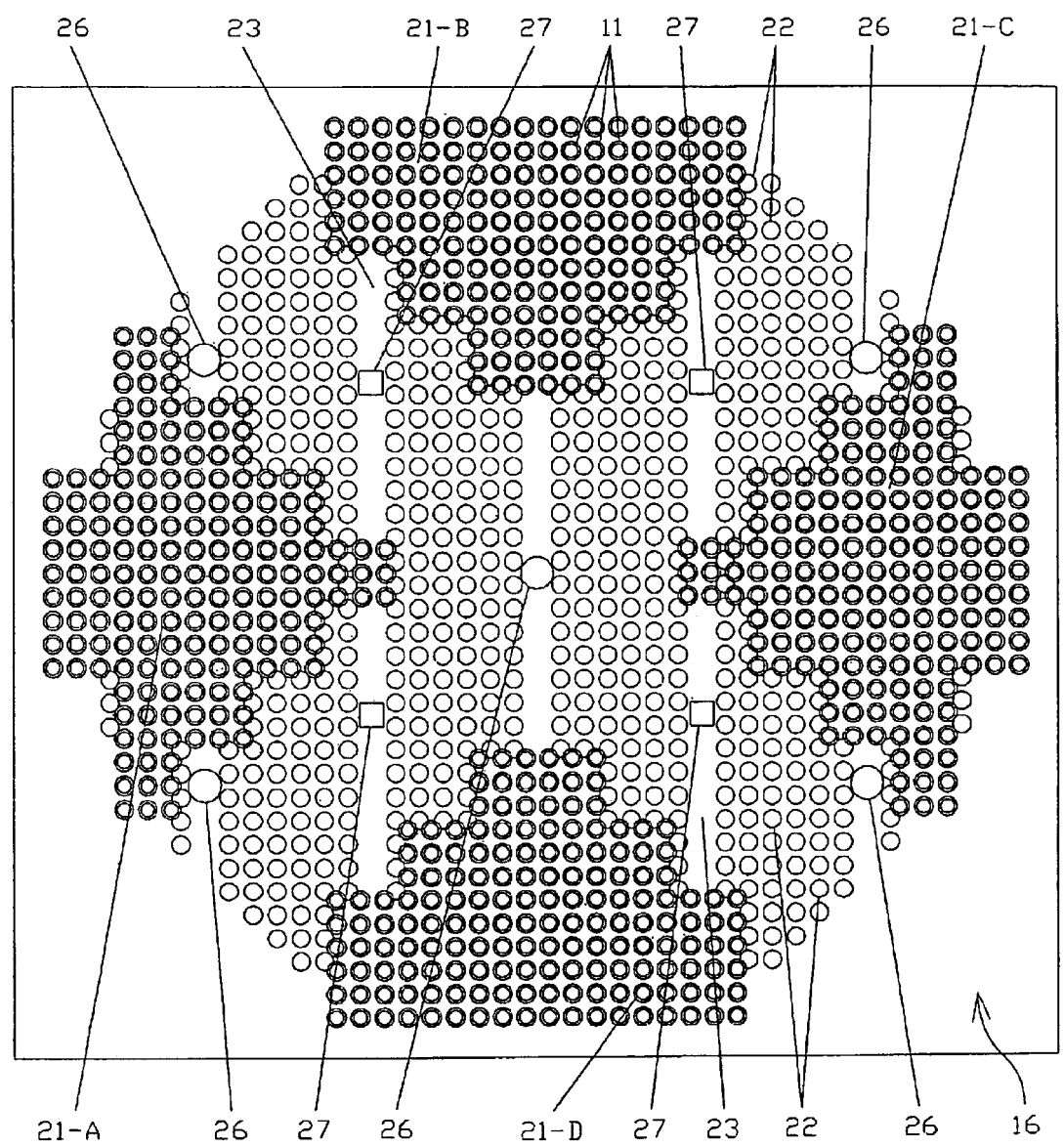
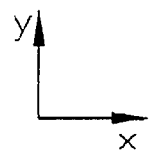
Figure 2

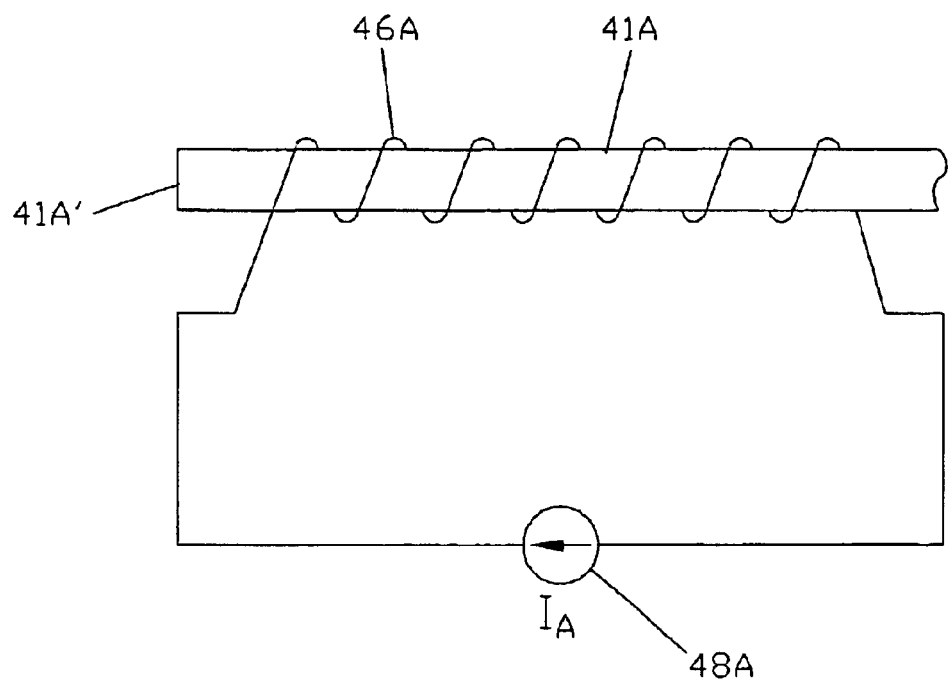
Figure 9-A
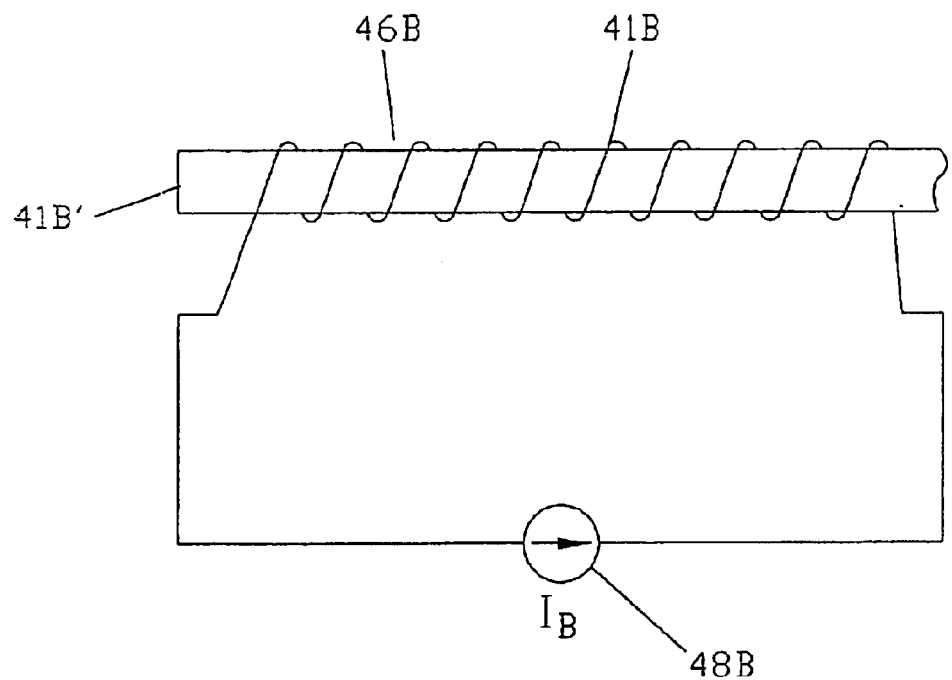
Figure 9-B

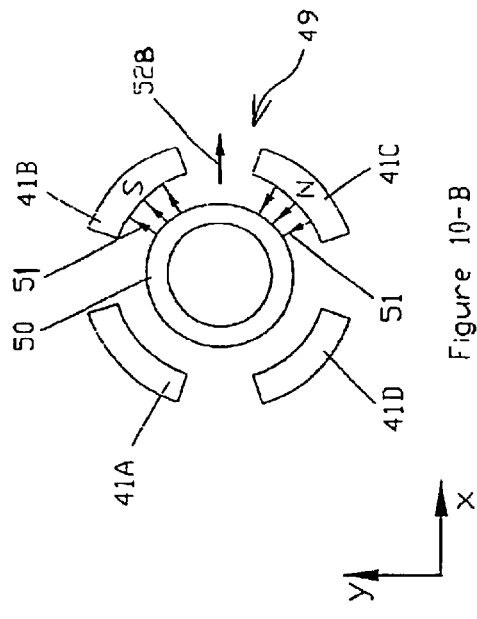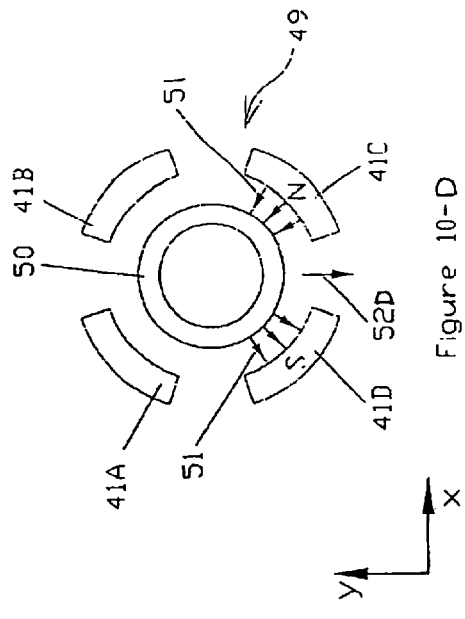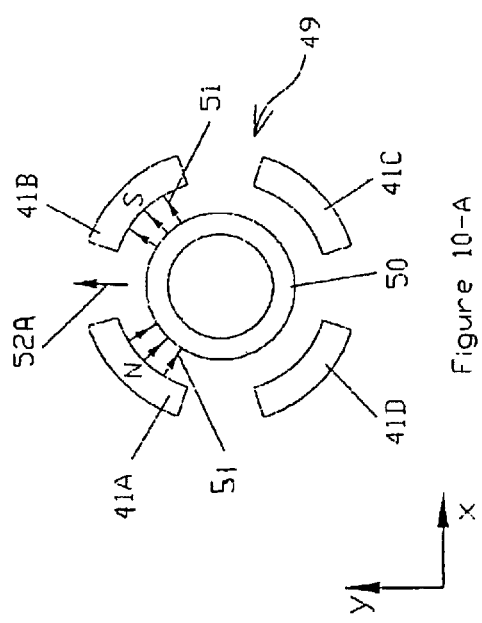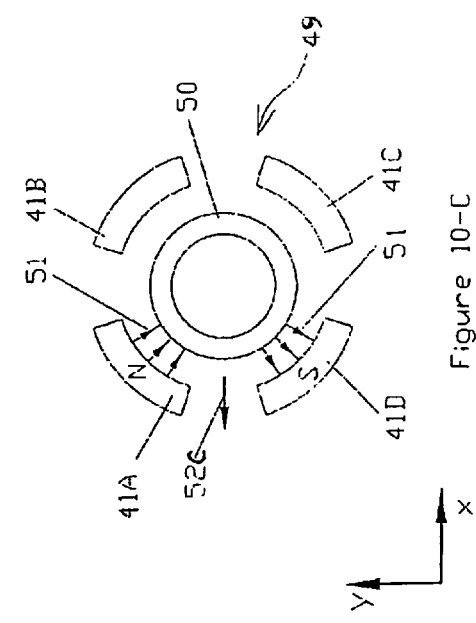
Figure 10

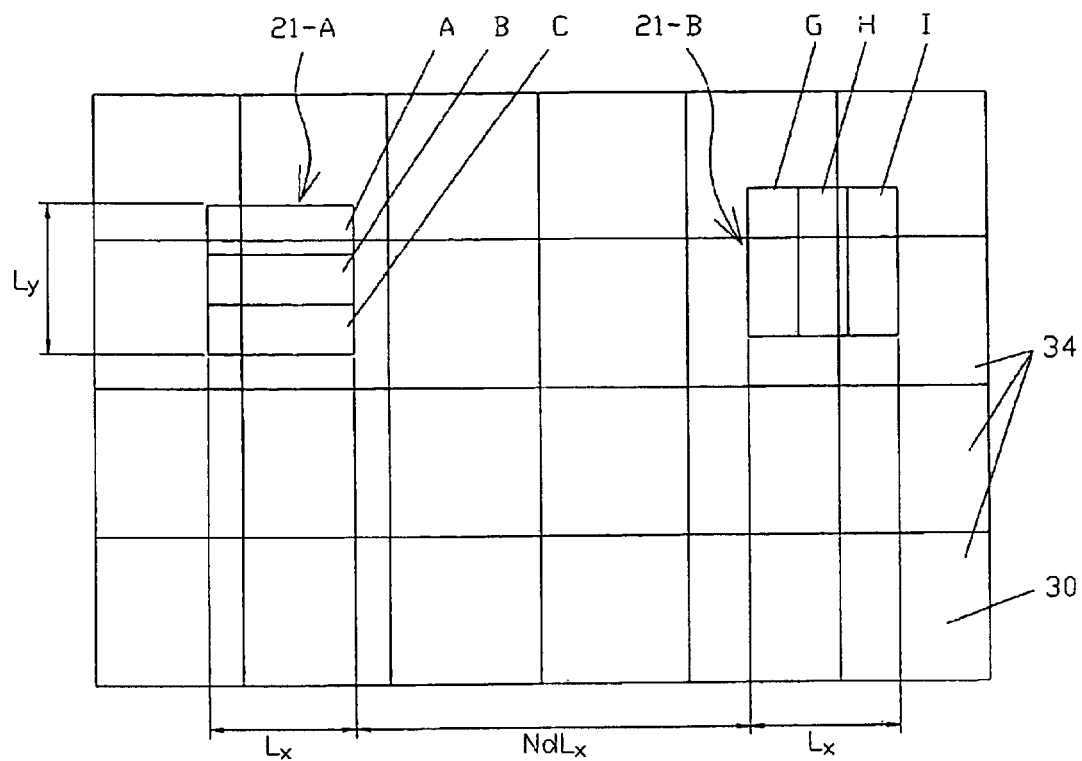
Figure 14-B
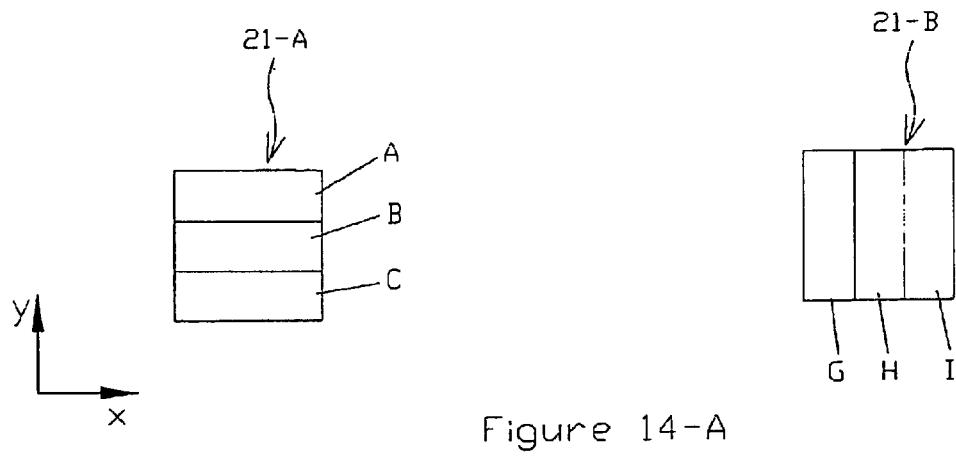
Figure 14-A

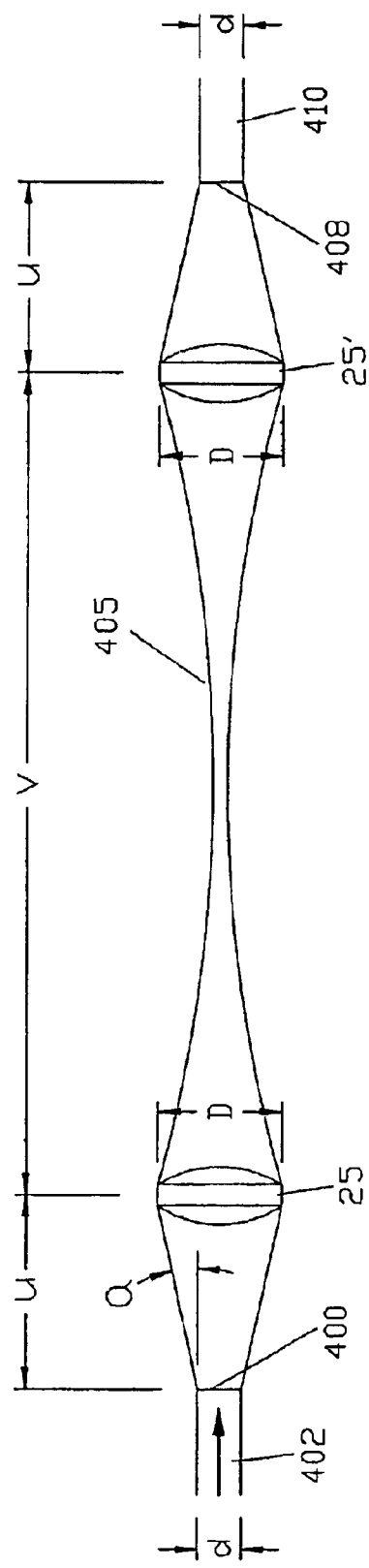
Figure 18-A
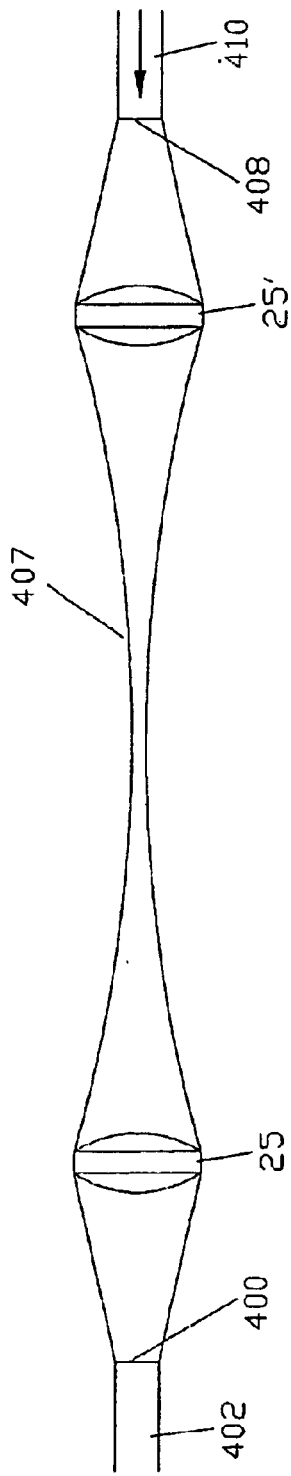
Figure 18-B

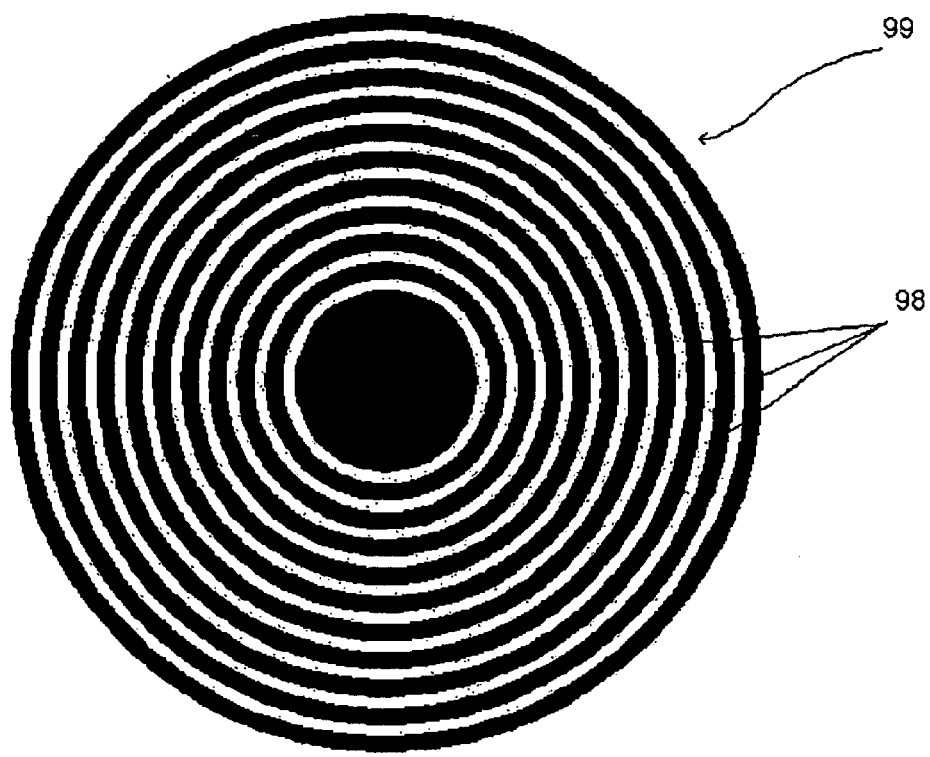
Figure 19-A
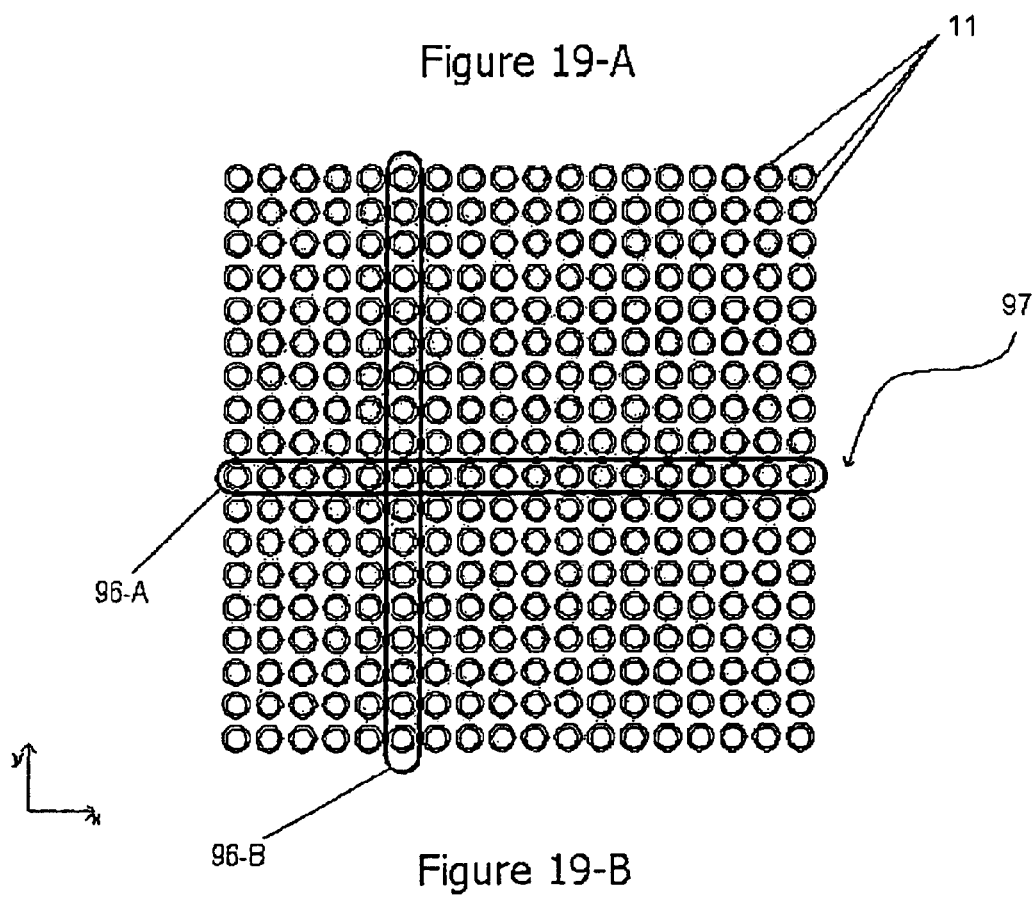
Figure 19-B

US 6,941,035 B2

OPTICAL CROSS-CONNECT SWITCH

RELATED APPLICATIONS

This application is a continuation-in-part of commonly-owned U.S. patent application Ser. No. 09/842,031 entitled ABSOLUTE POSITION MOIRÉ TYPE ENCODER FOR USE IN A CONTROL SYSTEM, filed Apr. 26, 2001, and a continuation of commonly-owned P.C.T. application No. PCT/CA02/00596 entitled OPTICAL CROSS-CONNECT SWITCH, filed Apr. 24, 2002. This application claims the benefit of the filing dates of these related applications.

FIELD OF THE INVENTION

This invention relates to optical switching and control systems for implementing optical signal connections between fibers in optical cross-connect switches.

BACKGROUND OF THE INVENTION

Digital communications, which may, for example, comprise data, voice or video signals may be carried in optical fibers. It can be desirable to interconnect optical fibers in different ways.

Optical cross-connect switches include a first group of one or more fibers on a first "side" of the switch and a second group comprising a plurality of fibers on a second "side" of the switch. The first and second "sides" of a switch relate to optical signal transmission pathways and not to a spatial arrangement. Such switches permit a fiber of the first group of fibers to be optically connected with a selected one of the fibers of the second group.

Optical cross-connect switches typically have control systems which identify two fibers that are to be optically interconnected, and align the fibers to provide an optical connection.

U.S. Pat. No. 5,206,497 discloses an optical cross-connect switch which employs a "one-sided" control system for targeting and alignment. This alignment control system attempts to direct an optical communication signal to a selected target position based on known device geometry and pre-calibrated target positions.

U.S. Pat. No. 6,005,998 discloses a switch comprising two arrays of light beam collimators. The switch comprises two motors with associated encoders to track their positions. The motors tilt a collimating lens on a transmission side of the switch, to direct a beam of a transmission fiber to a pre-calibrated target position on a receiving side of the switch. On the receiving side of the switch, two additional motors control the angle of a similar collimating lens to insert the communication signal into a selected receiving fiber.

U.S. Pat. No. 5,524,153, discloses a switch having a plurality of optical fibers, each housed in a switching unit. LED's are interspersed with the fibers. A control system can identify target fiber within the array of switching units by lighting LED's in a particular pattern to identify the fiber that is to be targeted for connection.

U.S. Pat. Nos. 6,097,858; 6,097,860; and 6,101,299, disclose a switch in which each of a plurality of fibers is housed in a switching unit. Each switching unit is associated with a number of LED's. The LED's emit control signals having a different wavelength from the communication signals. The control signals are used by a control system to make connections between desired pairs of optical fibers.

Prior art optical switches have various disadvantages including, undesirable complexity, undesirable size, undesirably slow operation, and interference between control signals and communication signals. There remains a need for optical cross-connect switches which avoid or at least reduce some of these problems.

SUMMARY OF THE INVENTION

A first aspect of this invention relates to an optical cross-connect switch for switching optical communication signals between any of a plurality of input optical channels and any of a plurality of output optical channels. The switch comprises a first pattern projector configured to project one or more first control signal radiation patterns and a plurality of output encoders. Each output encoder is associated with one of the plurality of output optical channels. Each output encoder is positioned, relative to its associated output optical channel and the first pattern projector, to receive the first control signal radiation patterns and to detect at least a portion of one or more corresponding output Moiré interference patterns produced by the control signal radiation patterns. Each output encoder is configured to generate a corresponding output control signal indicative of an intensity of detected output Moiré interference patterns.

The output optical channels may comprise optical fibers.

Each output encoder may include an associated output reticle with a spatially varying pattern of interaction with radiation incident thereon. The output reticle may be positioned to receive the one or more first control signal radiation patterns and to produce the one or more corresponding output Moiré interference patterns in response thereto. Each output encoder may also comprise an associated output radiation sensor. Each radiation sensor may be positioned to detect at least a portion of the one or more corresponding output Moiré interference patterns and configured to generate the corresponding output control signal.

Each of the output reticles may have a spatially varying transmissivity and each associated output radiation sensor may be located to detect radiation from the one or more first control signal radiation patterns that has passed through the associated output reticle. Alternatively, each of the output reticles may have a spatially varying reflectivity and each associated output radiation sensor may be located to detect radiation from the one or more first control signal radiation patterns that has reflected from the associated output reticle.

Each output reticle may be patterned with a regular array of cells. Each of the cells may comprise an aperture portion and an opaque portion. Alternatively, output reticle may be comprise a circularly symmetric pattern of aperture portions and opaque portions. Each output reticle may pass a first proportion of the first control signal radiation patterns incident on the aperture portion to the associated output radiation sensor and each output reticle may pass a second proportion, smaller than the first proportion, of the first control signal radiation patterns incident on the opaque portion to the associated output radiation sensor.

Each of the control signal radiation patterns may comprise a plurality of elongated stripes of radiation. Each of the control signal radiation patterns may comprise a spatially periodic radiation pattern. The period of the spatially periodic radiation pattern may be equal to a spatial periodicity of the cells on the output reticles. The cells on the output reticles may be arranged in rows extending substantially parallel to a first axis and columns extending substantially parallel to a second axis and each of first control signal radiation patterns may comprise elongated stripes which are oriented substantially parallel to one of the first and second axes.

The control signal radiation patterns may comprise at least one radiation pattern having a first wavelength and at least one radiation pattern having a second wavelength.

The switch may also include a second pattern projector configured to project one or more second control signal radiation patterns and a plurality of input encoders. Each input encoder may be associated with one of the plurality of input optical channels. Each input encoder may be positioned, relative to its associated input optical channel and the second pattern projector, to receive the second control signal radiation patterns and to detect at least a portion of one or more corresponding input Moiré interference patterns produced by the second control signal radiation patterns. Each input encoder may be configured to generate a corresponding input control signal indicative of an intensity of detected input Moiré interference patterns. The input encoders may have features substantially similar to those of the output encoders.

The switch may also comprise a controller connected to receive the input and/or output control signals. The controller may be configured to determine a position of each output reticle based on the corresponding output control signal and/or configured to determine a position of each input reticle based on the corresponding input control signal.

The pattern projector may include an array of first radiation emitting devices located in positions optically opposing the plurality of output optical channels. The first pattern projector may be configured to project the one or more first control signal radiation patterns by turning on selected pluralities of the first radiation emitting devices.

Each output encoder may comprise an associated output lens. The output lens may be located to focus the first control signal radiation patterns onto the associated output reticle. Each output lens may also be located to couple optical communication signals from a selected one of the plurality of input optical channels into the associated output optical channel.

Each output reticle may be coupled to move with the associated output optical channel. The one or more corresponding output Moiré interference patterns may then vary in intensity based on a position of the associated output reticle.

Each output reticle may alternatively be coupled to move with an associated moveable optical element. A position of each moveable optical element may influence an optical path of an optical communication signal coupled into the associated output optical channel. The switch may comprise a controller coupled to receive the output control signals from the output radiation sensors and configured to determine a position of the moveable optical element based on the corresponding output control signal.

The switch may comprise a plurality of output actuators. Each output actuator may be associated with one of the plurality of output optical channels. Each output actuator may comprise a magnetic member coupled to move with the associated output optical channel and a plurality of magnetically polarizable branches spaced apart around the magnetic member. The magnetic member may be circularly symmetric. The magnetic member may comprise a ring of magnetic material. The ring may extend around a peripheral edge of the associated output reticle. Each output actuator may comprise four output branches equally spaced apart around the magnetic member.

Another aspect of the invention provides an optical switch having a system for independently determining positions of each of a plurality of optical fibers in the optical switch. The position determination system comprises a plurality of reticles, each of which is coupled to move with a corresponding one of the optical fibers. Each reticle has a spatially varying pattern of interaction with radiation incident on the reticle. The position determination system also includes a pattern projector configured to project first and second radiation patterns onto all of the plurality of reticles and a plurality of radiation sensors. Each radiation sensor is associated with a reticle and is located to generate a control signal indicative of an intensity of radiation of the first and second radiation patterns which has interacted with the associated reticle.

Another aspect of the invention provides a method for coupling an input optical communication signal into an output optical channel selected from among a plurality of output optical channels. The method involves generating one or more output Moiré interference patterns using first control signal radiation. The output Moiré interference patterns vary with a position of a selected moveable output optical element which is associated with the selected output optical channel. The method also involves detecting at least a portion of the one or more output Moiré interference patterns and, based at least in part on the detected portion of the one or more output Moiré interference patterns, determining the position of the selected moveable output optical element.

Further aspects of the invention, features of specific embodiments of the invention and applications of the invention are described below.

BRIEF DESCRIPTION OF THE DRAWINGS

In drawings which illustrate non-limiting embodiments of the invention:

FIG. 2 depicts a chassis for an optical cross-connect switch according to one embodiment of the invention;

FIG. 9 depicts a method which may be used to impart a magnetic polarization to the actuator branches;

FIGS. 10A to 10D show a magnetic actuation system being used to move a fiber end in various directions;

FIG. 14 is a schematic diagram of radiation banks according to a simplified embodiment of the invention;

FIG. 18 is a schematic diagram that depicts communication signals being focused and transmitted across a switch interface;

FIG. 19A depicts a circular reticle in accordance with a particular embodiment of the present invention;

FIG. 19B depicts a radiation bank embodiment that may be used with the circular reticle of 19A.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
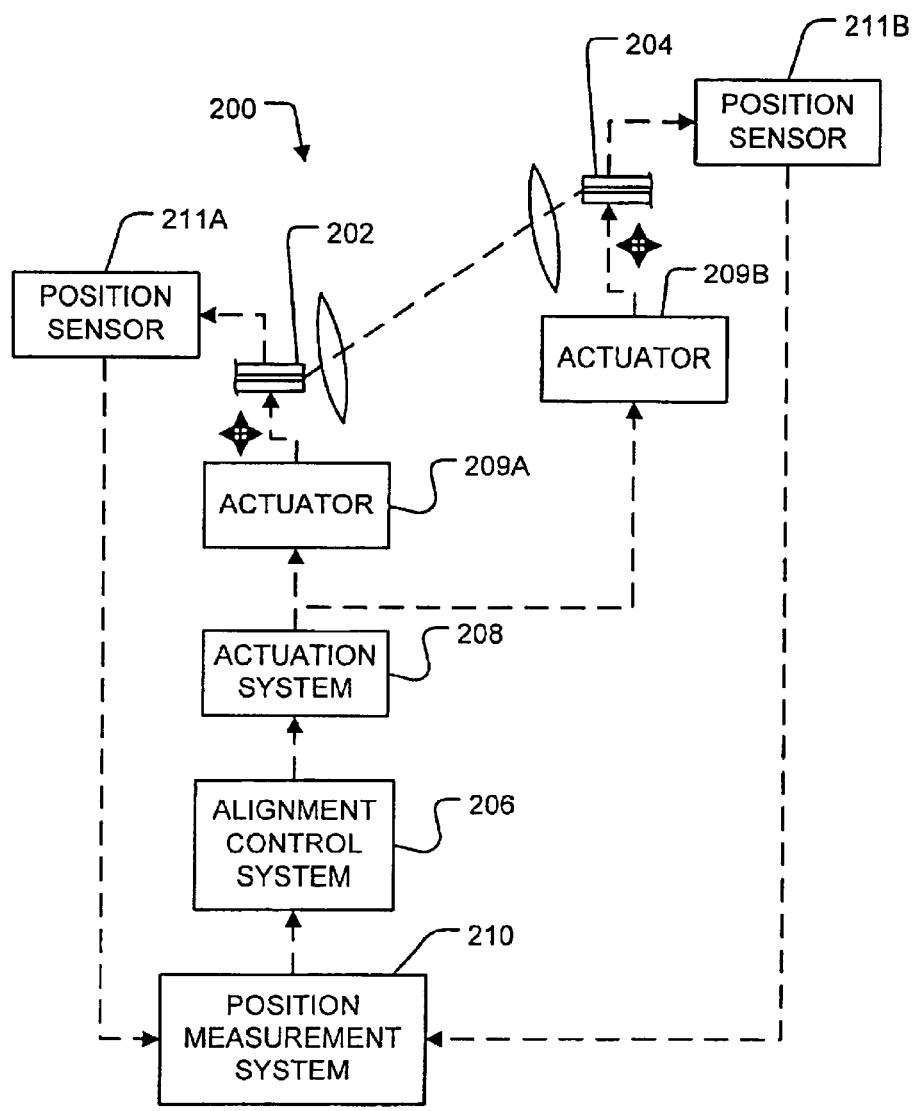
FIG. 1 is a block diagram showing major components of an optical cross-connect switch according to the invention.

This invention relates to optical cross-connect switches and alignment control systems for such switches. The invention may be applied to M×N type switches in which any one of a first set of M optical fibers may be placed in optical communication with any one of a second set of N optical fibers. FIG. 1 shows an example of a switch 200 that includes a first set of optical fibers which includes a first optical fiber 202 and a second set of optical fibers which includes a second optical fiber 204. Switch 200 has an alignment control system 206. Alignment control system 206 identifies one of the M first fibers to be optically connected to one of the N second fibers. Alignment control system 206 may receive commands from an external source. The commands identify pairs of first and second optical fibers to place into optical communication with one another. An actuation system 208 comprises an actuator 209A, which directs a selected one of the M first fibers into alignment with a selected one of the N second fibers and an actuator 209B, which directs the selected one of the N second fibers into alignment with the selected one of the M first fibers. A position measurement system 210 includes position sensors associated with each of the M first fibers and each of the N second fibers. Position sensor 211A is associated with fiber 202 and position sensor 211B is associated with fiber 204. Alignment control system 206 receives information from position measurement system 210 and uses this information to determine actuator signals, which are sent to actuation system 208, so that the alignment of the selected one of the M first fibers and the selected one of the N second fibers may be accomplished in a controlled manner.

Alignment control system 206, actuation system 208 and position measurement system 210 may share components In this disclosure, "light" and "radiation" are used interchangeably. "Light" is not limited to visible light and includes electromagnetic radiation of any suitable wavelength.

Figure 1A:
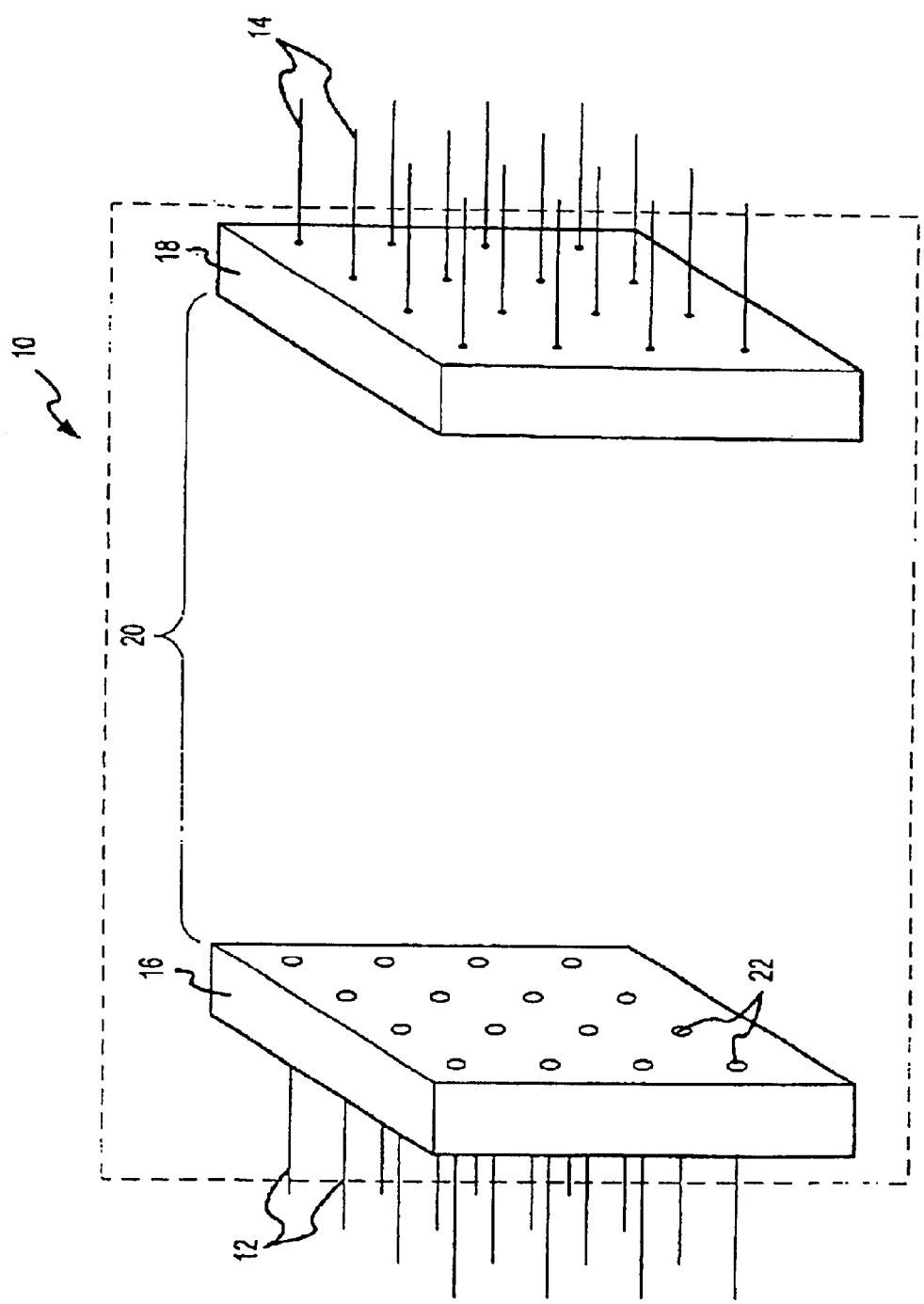
FIGS. 1A to 1C depict various optical cross-connect switch architectures.
Figure 1B:
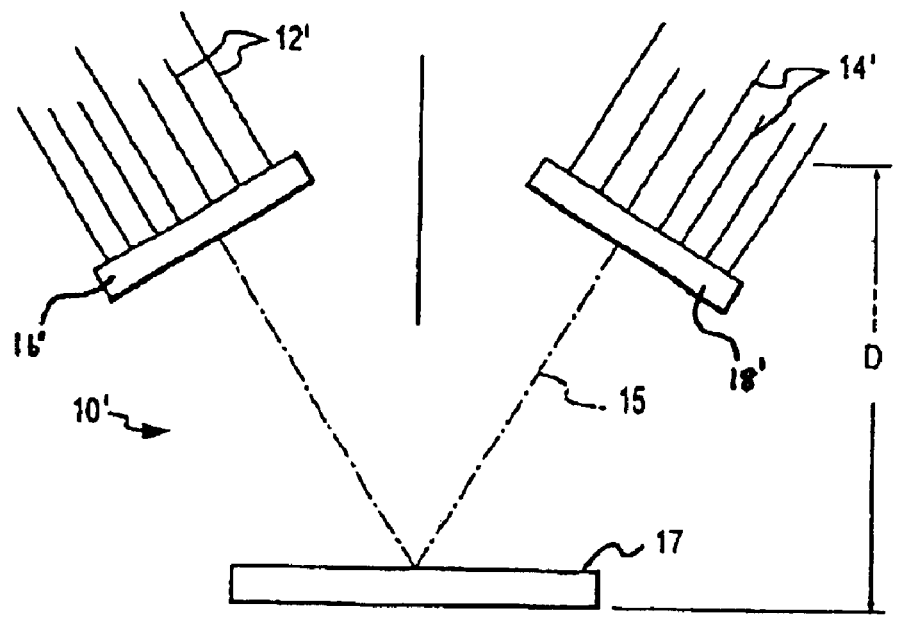
Figure 1C:
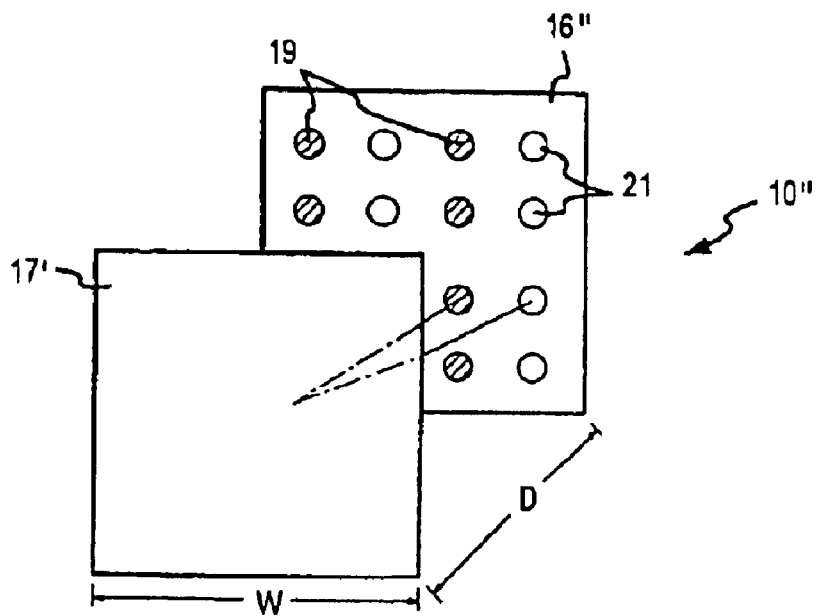

FIGS. 1A–1C are schematic representations of possible configurations for an M×N switch. FIGS. 1A–1C show 16×16 switches. Switches according to this invention may have fewer fibers or many more. For example, a switch according to the invention may be 1024×1024 or even larger.

FIG. 1A illustrates a switch 10 having an opposing chassis configuration. Switch 10 comprises a first chassis 16 located directly opposite to a second side chassis 18. A plurality of first fibers 12 are mounted in first chassis 16. Each first fiber 12 may be optically connected to one of a plurality of second fibers 14 in second chassis 18. Once made, the optical connection between a first fiber 12 and a second fiber 14 can carry an optical communication signal. "Communication signal" means a light beam which can be modulated to carry data of any kind. A communication signal may be bidirectional. Communication signals may include, without limitation, zero modulation signals that result in a constant wave optical beam. Typical communication signals have wavelengths of $\lambda=1310$ nm and $\lambda=1550$ nm. However, a switch according to the invention may handle communication signals of any wavelength.

First chassis 16 and second chassis 18 are separated by a transmission cavity 20. Preferably, transmission cavity 20 is relatively empty, so that communication signals can be transmitted between any of first fibers 12 and any of second fibers 14. Each of fibers 12 and 14 is associated with a switching unit 22.

Each switching unit 22 comprises a lens (not shown in FIGS. 1A to 1C), which shapes the radiation beams of communication signals emanating from (or entering) the corresponding fiber 12 or 14.

FIG. 1B shows a switch 10' which has a flat mirror 17 located so that any fiber 12' on chassis 16' may be optically connected with any one of fibers 14' on chassis 18'. The folded optical pathway indicated generally by phantom line 15 illustrates a typical optical path for a communication signal associated with such a connection. A switch may be implemented using multiple folds in the optical pathway, so as make the switch 10' conform to the required physical dimensions.

FIG. 1C shows a switch 10", which employs a single chassis 16" facing a flat mirror 17'. Switch 10" comprises first and second groups of switching units 19 and 21 that are both located on a single chassis 16'. This configuration can also be used to make switch 10" compact. Although only three configurations have been described, it will be appreciated that using simple optical elements, many possible configurations can be implemented, provided that these configurations allow for optical path connection between fibers.

In this disclosure, two fibers in a switch are on "different sides" if the switch can optically couple the two fibers. A "side" may transmit or receive optical communication signals, or both, and is not necessarily physically distinct from or adjacent to the opposing "side".

Each fiber has an associated actuator 209. Actuators 209 are controlled by alignment control system 206. Alignment control system 206 operates the actuators of selected pairs of fibers to facilitate the transmission of optical communication signals between the fibers of each selected pair. Alignment control system 206 may receive information specifying alignments of the fibers from a position measurement system 210.

FIG. 2 depicts two Cartesian axes x and y. Positions of the ends of fibers 12, 14 are described herein as being specified relative to these axes. The axes x and y are not uniquely chosen. Other coordinate systems could be used to describe locations of the ends of fibers 12, 14.

Each switching unit 22 of FIG. 2 comprises a lens 25 (see FIG. 7), which focuses radiation entering or exiting the switching unit 22. Lens 25 may comprise any combination of one or more optical elements that achieves the functional goals described herein. In typical operation, lens 25 receives communication signals from a fiber on the other "side" of the switch and focuses the communication signal on the fiber end 12'. Where switching unit 22 has a fiber 12 that is transmitting communication signals, lens 25 focuses outgoing communication signals from the fiber end 12'.

FIGS. 18A and 18B depict schematically the transmission of a communication signal beam across the switch interface. Extraneous elements, such as bending mirrors and other switching unit elements are omitted in FIGS. 18A and 18B. In order to reduce optical losses, it is preferable (but not necessary) that the communication signal be a focused beam (as opposed to a collimated beam susceptible to divergence). Communication signals from the end 400 of the core of a first side fiber 402 are focused by lens 25 forming a beam 405, which has a "waist" in the switch interface cavity and which is directed substantially onto the surface of the second side lens 25'. Second side lens 25' receives the communication signal beam 405 and distributes it across the end 408 of the core of second side fiber. 410. In a similar manner, a focused communication signal beam 407 may be transmitted from the second side fiber 410 to the first side fiber 402 as depicted in FIG. 18B.

Figure 7:
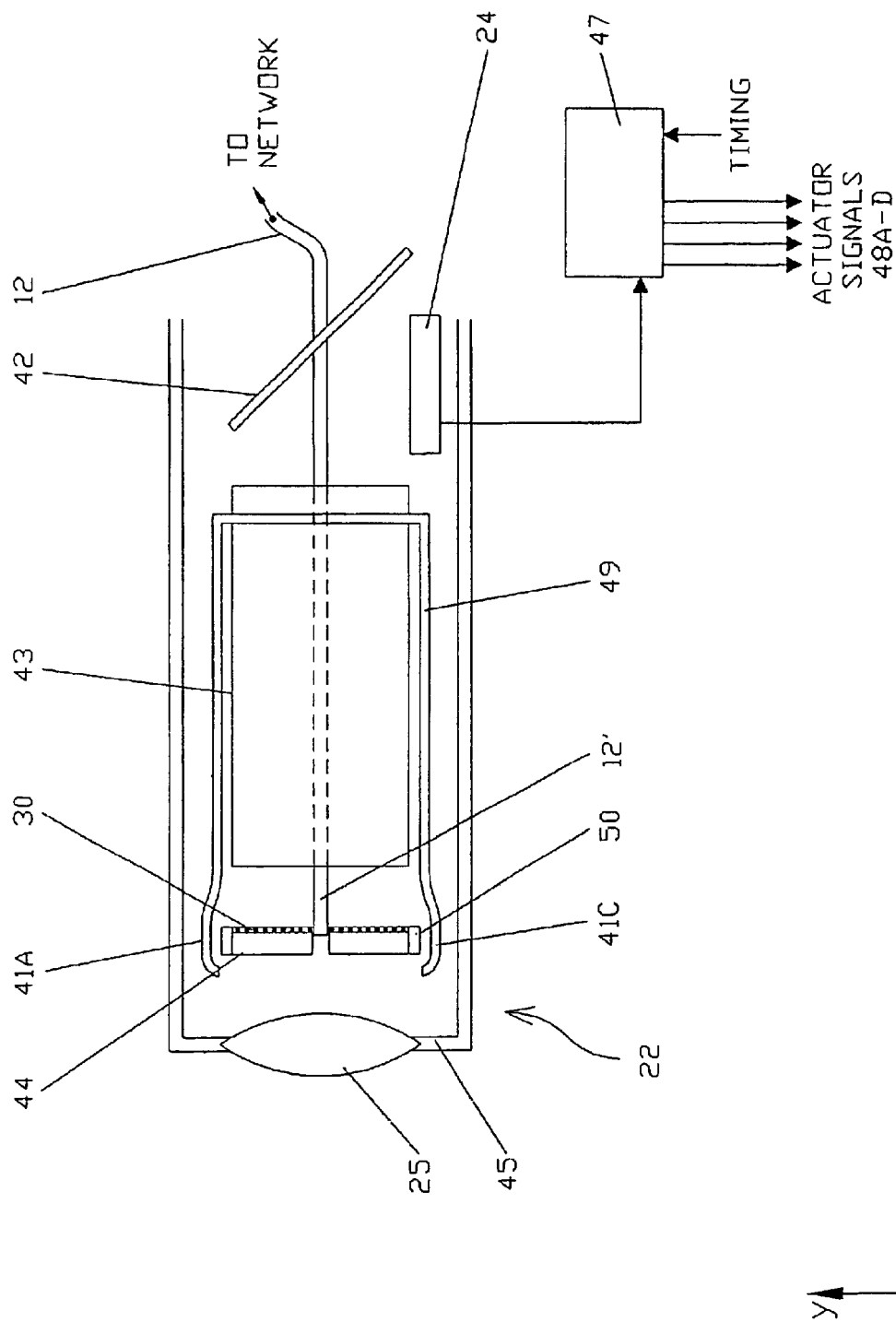
FIG. 7 is a cross sectional schematic view of a unit in the plane A—A of FIG. 8.
Figure 8:
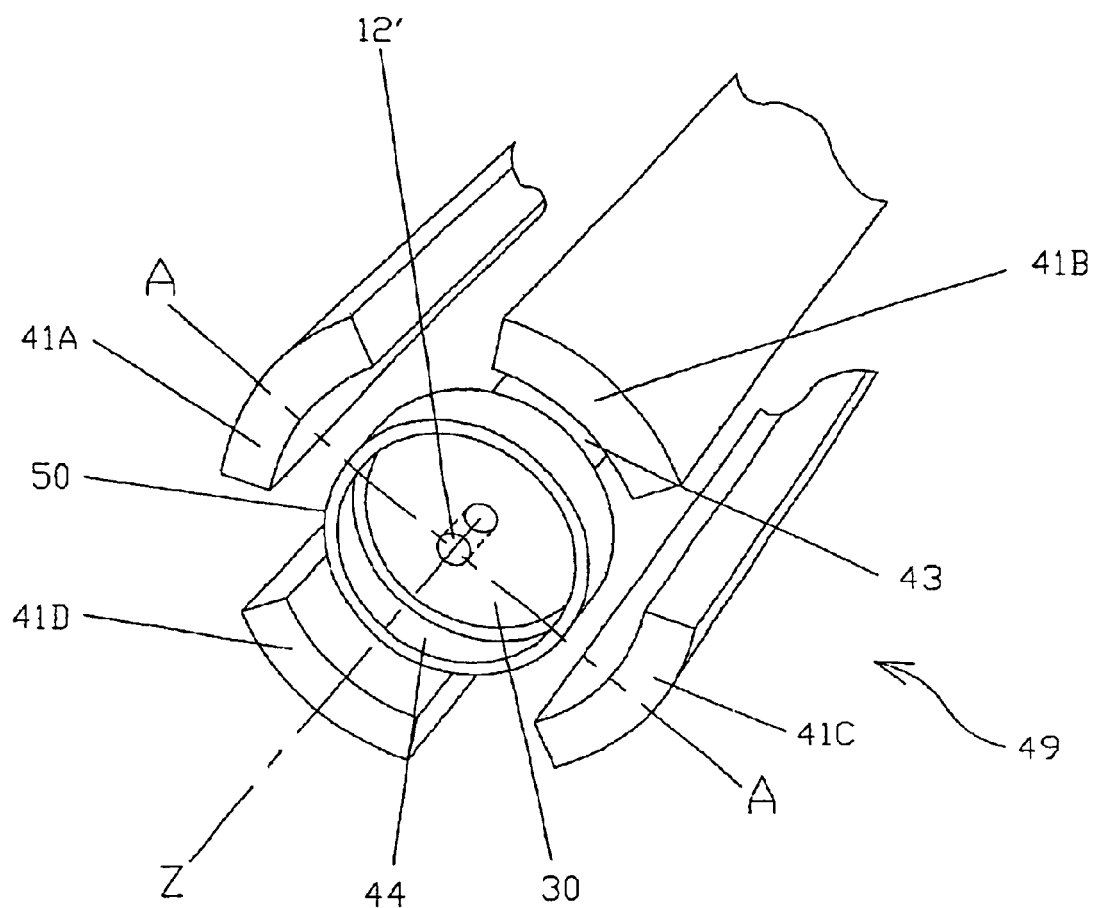
FIG. 8 is a schematic diagram of a magnetic actuation system according to an embodiment of the invention in which some parts are omitted for clarity.

FIG. 7 depicts a switching unit 22 according to one embodiment of the invention. Switching unit 22 comprises an actuation system 49, one embodiment of which is further depicted in FIGS. 8 and 9. Referring to FIGS. 7–9, actuator system 49 employs magnetic fields to position the ends 12' of an individual fiber 12 in two dimensions. Actuator system 49 comprises a magnetic member 50 connected to move with end 12' of fiber 12. Member 50 is preferably circularly symmetrical and may comprise a ring of a magnetic material such as a metal. Magnetic member 50 may comprise a ferrite material (such as an alloy comprising of nickel and iron).

Member 50 interacts with magnetic fields developed by actuator branches 41A, 41B, 41C and 41D (collectively, actuator branches 41). In the illustrated embodiment, the individual actuator branches 41A, 41B, 41C and 41D are positioned so as to be substantially symmetrically located between the x and y axes. In such an embodiment, the center of each individual actuator branch (41A, 41B, 41C and 41D) is located at approximately 45 degrees between the x and y axes.

Actuation system 208 (see FIG. 1) provides actuator signals 48A, 48B, 48C and 48D (collectively, actuator signals 48). Actuator signals 48 magnetically polarize actuator branches 41 by passing electrical current through windings (not shown) in actuator branches 41. Branches 41 may be made of a ferrite material. Other materials may also be used. By varying the magnetic polarization of individual branches (41A, 41B, 41C and 41D) actuation system 208 can cause magnetic member 50 to move and to carry end 12' of the corresponding fiber to a desired "target" position.

In the illustrated embodiment, member 50 comprises a ring which extends around the periphery of a transparent disk 44. Fiber end 12' is mounted to disk 44. Switching unit 22 comprises a reticle 30 for a position measurement system. Advantageously, reticle 30 is mounted behind transparent disk 44.

The interaction between actuator branches 41 and member 50 may be understood by referring to FIGS. 9A and 9B, which schematically depict a portion of the actuator branches 41A and 41B with respective coils 46A and 46B wrapped around them. Actuator signal 48A controls the magnitude of a current supplied by current source $I_A$ and, similarly, actuator signal 48B controls the magnitude of a current supplied by current source $I_B$. When current passes through coil 46A, a magnetic field is generated and the actuator branch 41A is polarized. The active end 41A' of actuator branch 41A acquires a magnetic north polarization. Similarly, when current passes through coil 46B, a magnetic field is generated, actuator branch 41B is polarized and the active end 41B' of actuator branch 41B acquires a magnetic south polarization. The strength of the magnetic fields associated with the polarization of active ends 41A' and 41B' of actuator branches 41A and 41B is controlled by the amount of current that flows through coils 46A and 46B.

Each of FIGS. 10A through 10D show a plan view of the end of a switching unit 22. FIG. 10A shows how the actuator branches 41A and 41B are polarized to move member 50 in the positive y direction (indicated by arrow 52A). Actuator branch 41A is polarized to be a north magnetic pole and actuator branch 41B is polarized to be a south magnetic pole. In a manner similar to that of a conventional horseshoe magnet, the polarization of actuator branches 41A and 41B creates a magnetic flux (indicated by arrows 51) which draws member 50 (and hence the fiber end 12' (see FIGS. 7 and 8)) in direction 52A.

FIG. 10B shows how actuator branches 41B and 41C are polarized to move member 50 in the positive x direction by polarizing branches 41B and 41C to be south and north magnetic poles respectively. This polarization creates force, which moves member 50 and the fiber end in the positive x direction indicated by arrow 52B.

FIG. 10C shows branch 41A with a north polarization and branch 41D with a south polarization, so as to move member 50 in negative x direction 52C. FIG. 10D shows branch 41C with a north polarization and branch 41D with a south polarization, so as to move member 50 in negative y direction 52D. By using linear combinations of the above described configurations, actuator system 49 can move member 50 and fiber end 12' in any direction on the two-dimensional plane of the x and y axes.

The design of the actuation system overcomes some difficulties associated with prior magnetic-based fiber bending actuation systems. The design maximizes the transverse magnetic flux, and corresponding force, experienced by member 50 in the two-dimensional plane spanned by the x and y axes, while minimizing forces that tend to tilt or rotate member 50. The design also reduces cross-talk between actuation systems in adjacent switching units 22.

Actuator branches 41 may be situated quite close to one another to make switching unit 22 compact. It is desirable to reduce the amount of magnetic flux which jumps directly between two polarized branches. Flux lines that jump directly between branches 41 do not contribute to the movement of member 50 and represent losses of power. For example, in FIG. 10-A, it is desired for the magnetic flux (indicated by arrows 51) to emanate from actuator branch 41A, pass through member 50, and then pass from member 50 into actuator branch 41B. To minimize the parasitic loss of flux, actuator branches 41 may be designed to be as short as possible, as far apart as possible and to have an optimal surface curvature, while still capable of being polarized at or near the magnetic saturation of the branch material. Member 50 may comprise a ring, which is wide along the z-axis (see FIG. 8), so as to maximize its surface area capable of receiving magnetic flux. Reducing the amount of magnetic flux which jumps directly between two polarized branches helps to minimize the switching time for a given power consumption.

The "cup" shaped curvature of actuator branches 41 and the cylindrical shape of member 50 help to minimize the torques that tend to cause second order bending (i.e. bending in an "S-shaped" mode) of fiber 12 and/or rotation of member 50 about the z axis). The cup shape of branches 41 helps to create a force on member 50 that has no appreciable components oriented along the z-axis. The cylindrical shape of member 50 ensures that there is circumferential symmetry and that there are no torques that might cause member 50 to rotate about the z-axis. The length of actuator branches 41 and the corresponding length of bare fiber 12 can be chosen to compensate for the possibility of mechanical resonance.

Where switching units 22 are small, only small movements are required of actuation system 49. This permits actuation system 49 to have reduced power consumption and fast switching times. Magnetic actuation system 49 can be designed for operation with voltages lower than voltages required by piezoelectric actuation systems.

Piezoelectric, mechanical or micro-mechanical means could also be used to move the ends of optical fibers in a switch according to some embodiments of this invention. Alternatively, an alignment control system according to some embodiments of the invention may be implemented by inserting moveable optical elements, such as micro-electro-mechanical system (MEMS) mirrors into the paths of communication signals to direct the communication signals between fibers.

During typical switch operation, alignment control system 206 (see FIG. 1) receives an externally generated network command requesting that a particular switching unit 22 be configured to receive communication signals from a switching unit 22 on the opposite "side" of the switch. In the embodiment of FIG. 7, alignment control system 206 comprises a controller 47. The term "controller" (i.e. controller 47) includes all processors capable of providing the functionality described herein and includes, without limitation, embedded microprocessors, dedicated computers, groups of data processors or the like. Controller 47 may also be shared with other systems, including actuation system 208 and position measurement system 210 (see FIG. 1). In order to optimise the reception of such communication signals, fiber end 12' must be moved in two dimensions to a "target position", where the insertion of the communication signal into the core of fiber end 12' is maximized. The two dimensions of movement of fiber end 12' are in the plane substantially perpendicular to the page of FIG. 7. Movement of fiber end 12' is controlled by alignment control system 206 and controller 47.

A fiber position measurement system 210 (see FIG. 1) determines the current position of fiber end 12'. Prior to receiving the externally generated network command, fiber 12 will typically be out of alignment (i.e. the actual position of fiber end 12' will be different from the target position). Using the target position of fiber end 12' and current and previous measurements of the actual position of fiber end 12', controller 47 uses control theory techniques to generate actuator signals 48. Depending on timing requirements and controller resources, alignment control system 206 may cause the actuation system to run "open loop" for an initial period during large jumps (i.e. where the target position is significantly different than the actual position). In open loop mode, controller 47 sets actuator signals 48 at levels that are independent of the actual position of fiber end 12'.

After a brief period of open loop operation, alignment control system 206 resumes control of actuator signals 48 using positions measured by position measurement system 210 for feedback. When the actual position of fiber end 12' reaches the target position, controller 47 is said to be "servo-locked" on the target position. Once servo-locked on the target position, any small deviations of the actual position from the target position may be rectified by controller 47.

Although the above discussion describes alignment control system 206 from the perspective of a particular switching unit 22, it should be appreciated that control of the transmitting and receiving fiber ends occurs simultaneously in the associated switching units 22 on both "sides" of the switch. That is, alignment control system 206 controls the position of the fiber end in the transmitting switching unit to optimise the direction of the transmission of communication signals to a particular receiving switching unit on the other "side" of the switch. Simultaneously, alignment control system 206 controls the position of the fiber end in the receiving switching unit to optimise the reception of the communication signal from a particular transmitting switching unit on the other "side" of the switch. For this reason, alignment control system 206 disclosed herein may be said to be a "two-sided" control system as opposed to some of "one-sided" prior art control systems. A two-sided control system has the advantage of increasing the effective numerical aperture of the receiving fibers. In addition, two-sided control can compensate for small movements of components on either side of the switch.

Position measurement system 210 may comprise a two-dimensional "Moiré type" position encoder associated with each switching unit 22 and each fiber 12. To measure a position of their associated fiber, the encoders use optical position signals from radiation sources, which may be mounted on the opposing "side" of the switch. The same optical position signals may be used by encoders for all switching units 22 on one side of the switch. The two-dimensional position encoders may be as disclosed in the related application described above, which is hereby incorporated by reference.

Position measurement system 210 operates by projecting radiation patterns onto reticles 30, which move with the ends 12' of fibers 12 (see FIG. 7). Photodetectors 24 in each of switching units 22 detect the intensity of radiation from the projected radiation patterns after they have interacted with corresponding reticle 30. In switching unit 22 of FIG. 7, the radiation patterns are imaged by lens 25 through transparent disk 44 and onto reticle 30. The portion of the radiation that is transmitted through reticle 30 is then collected by light pipe 43, which internally reflects the radiation as it is directed toward mirror 42. Mirror 42 reflects the radiation toward a photodetector 24, which measures the intensity of the radiation and delivers an electronic signal to controller 47. The radiation patterns are preferably projected onto outer portions of reticle 30 away from fiber end 12'.

Transparent disk 44, light pipe 43 and mirror 42 are not fundamental to the invention. In general, the invention should be understood to incorporate any optical means of collecting the radiation transmitted through reticle 30 and directing it towards photodetector 24.

The radiation patterns may be provided by radiation sources located on each "side" of the switch. The radiation sources preferably emit radiation at wavelengths different from wavelengths used for communication signals and may, for example, comprise radiation emitting devices (referred to herein as RED's), such as light-emitting diodes, laser diodes, or other types of devices that emit detectable radiation. The radiation sources may, for example, emit light having a wavelength of λ=940 nm where communication signals have wavelengths of λ=1310 nm or λ=1550 nm.

Photodetectors 24 are preferably sensitive to the radiation emitted by REDs 11, but not to the communication signals. For example, photodetector 24 may comprise a conventional Si photodetector, which is sensitive to radiation at λ=940 nm and not sensitive to communication signals at longer wavelengths such as λ=1310 nm or λ=1550 nm.

FIG. 2 depicts a plan view of a chassis 16 representing one "side" of an optical switch in accordance with a particular embodiment of the invention. The other "side" of the switch (not shown in FIG. 2) has a chassis substantially similar to that of FIG. 2. Chassis 16 of FIG. 2 depicts a possible layout of the control signal RED's 11 and switching units 22. FIG. 2 shows that the control signal RED's 11 are arranged into four groups (21A, 21B, 21C and 21D), which are referred to as "radiation banks" (collectively, radiation banks 21).

RED's 11 are not associated with any particular switching units 22 or any particular fiber 12. RED's 11 are collectively associated with the fiber position measurement for all of a plurality of switching units 22 on the other "side" of the switch. RED's 11 may be located separately from switching units 22, provided that they are in optical communication with switching units 22 on the other "side" of the switch.

Figure 3:
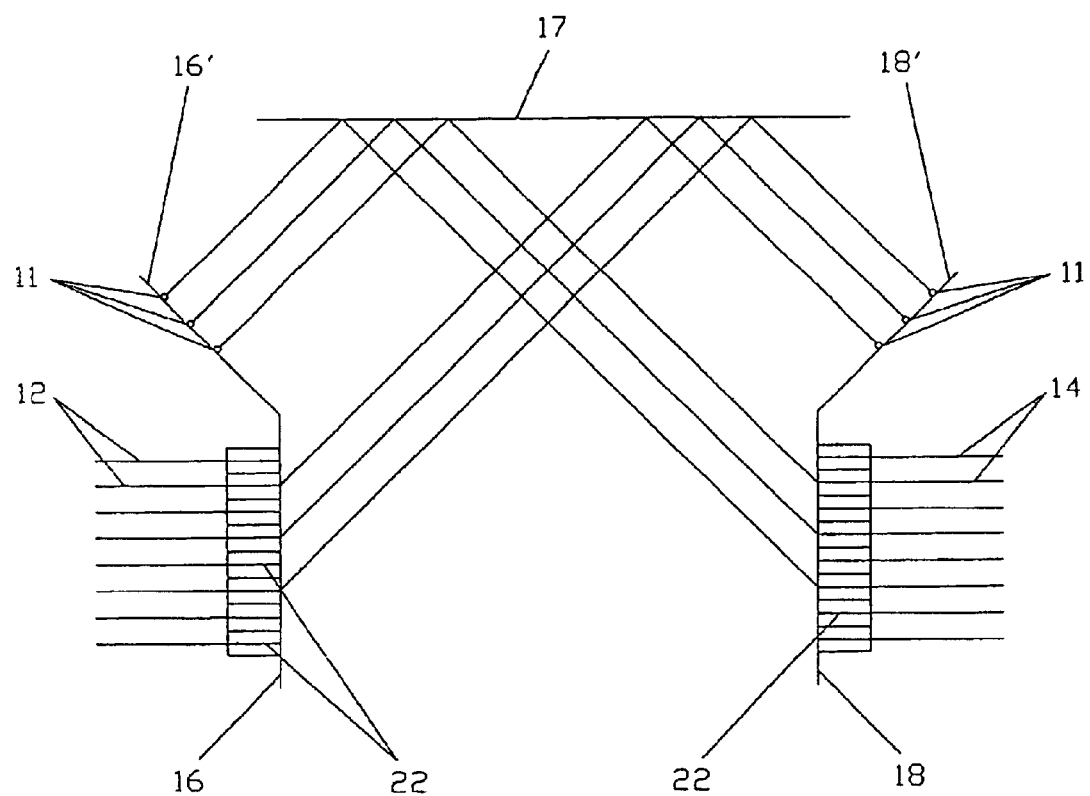
FIG. 3 depicts a chassis for an optical cross-connect switch according to an alternative embodiment of the invention.

An implementation having control signal RED's 11 that are separated from switching units 22 is depicted in FIG. 3. FIG. 3 depicts two optically opposed chassis 16 and 18, which house switching units 22. Each chassis 16 and 18 has a separate component 16' and 18', which contains RED's 11. The control signals from RED's 11 on chassis component 16' are reflected onto the face of chassis 18 by mirror 17. Similarly, control signals from RED's 11 on the chassis component 18' are reflected onto the face of chassis 16 by mirror 17. Because individual RED's 11 are not associated with any particular switching units 22 or fibers 12 or 14, there are many possible arrangements of RED's 11 in combination with lenses, mirrors and/or other optical elements capable of achieving the required functionality.

In the embodiment illustrated in FIG. 2, individual control signal RED's 11 in radiation banks 21 are packed between switching units 22 to minimize the size of chassis 16 and the overall size of the switch. In the regions of radiation banks 21, each RED 11 is packed between four adjacent switching units 22.

Figure 4:
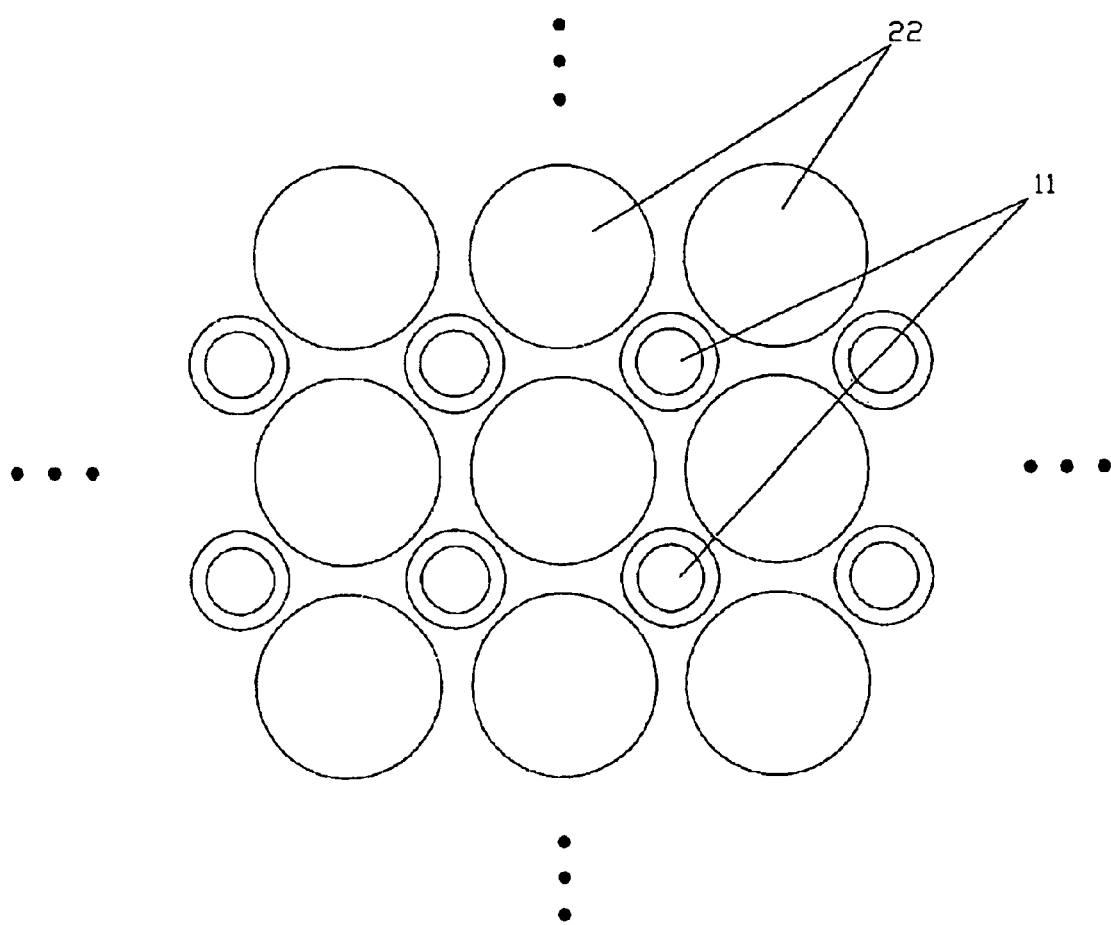
FIG. 4 depicts a scheme of packing control signal RED's between switching units on a chassis.

FIG. 4 is a close up view of a number of switching units 22 and RED's 11 on chassis 16 in the region of radiation bank 21A. The arrangement of FIG. 4 is not the only scheme for closely packing control signal RED's 11 and switching units 22. The invention should be understood to incorporate other simple packing schemes designed to maximize the number of switching units 22 and maintain a sufficient number of control signal RED's 11 on a two dimensional chassis surface. The dimensions of switching units 22 may vary from implementation to implementation or even as between individual switching units 22 within a particular switch.

The chassis of FIG. 2 has three regions 23 oriented along the y axis, where there are no switching units 22. These regions 23 may be used for mounting chassis 16 to the body of the switch, mounting switching units 22 to chassis 16 and, to house calibration sensors 26, which are employed to calibrate the alignment control system 206 prior to use. Calibration sensors 26 may comprise photodetectors which are sensitive to the wavelengths of the communication signals but not to the wavelength of the RED's. For example, calibration sensors 26 may comprise Germanium photodetectors which can detect light having wavelengths of λ=1310 nm and λ=1550 nm, but not light having a wavelength of λ=940 nm.

In a calibration procedure light directed through each fiber may be directed on the calibration sensors 26, which act as targets. With a knowledge of the sensor location (i.e. on chassis 16) with respect to the location of switching units 22, the system can be calibrated.

Figure 5:
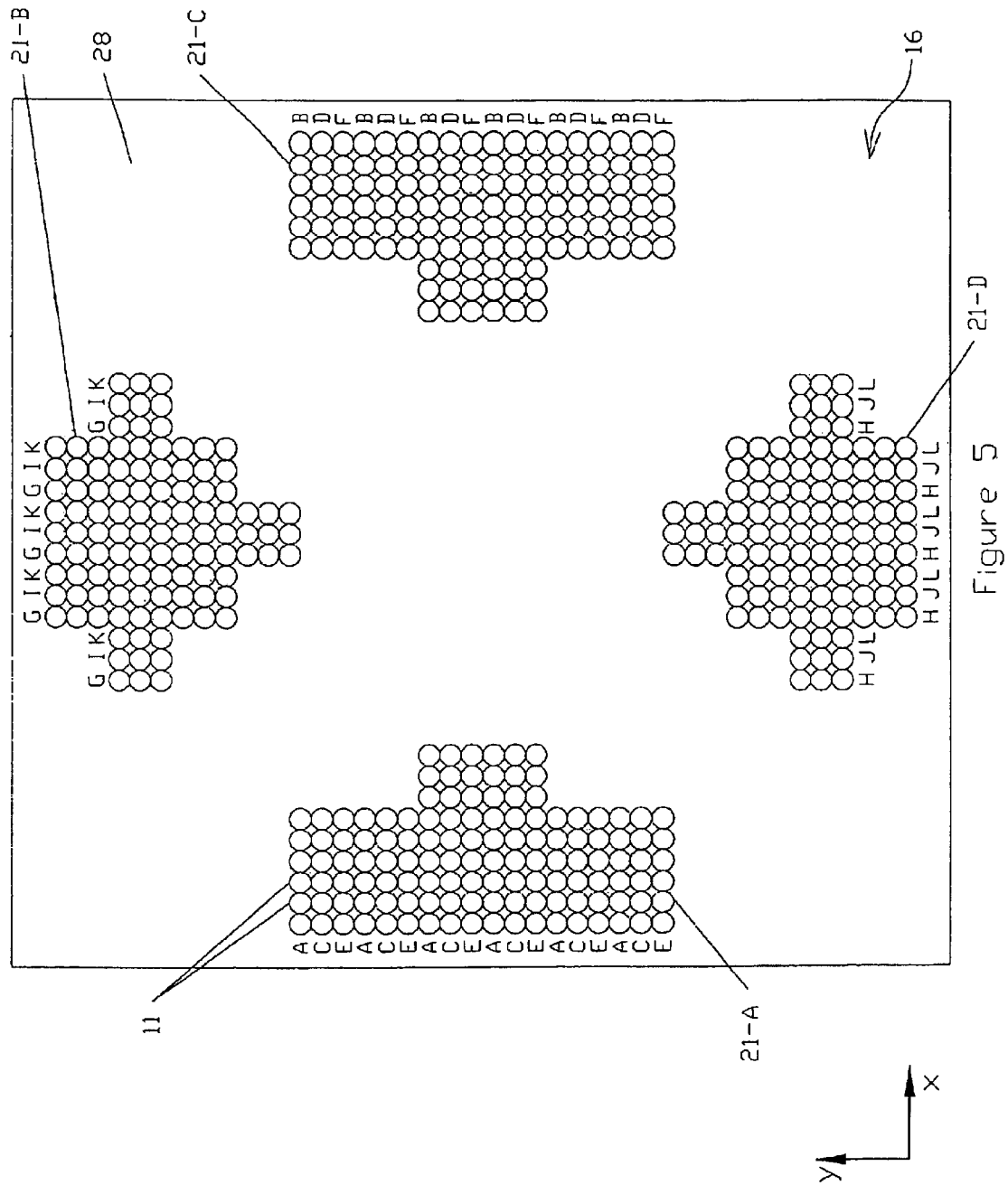
FIG. 5 shows an embodiment of the radiation banks, the radiation stripes and the associated phases on the chassis.

FIG. 5 depicts chassis 16 and RED's 11 of a particular embodiment of the invention. Switching units 22 are not shown in FIG. 5. The fiber position measurement system 210 may be implemented with two or more radiation banks 21. A currently preferred embodiment of the invention comprises four radiation banks (21A, 21B, 21C and 21D).

Each radiation bank 21 comprises several spatially periodic groups of radiation stripes (A through L) made up of rows or columns of RED's 11. The individual radiation stripes of radiation banks 21 have an elongated shape and are said to be "oriented" along a particular axis if their elongated shape is substantially parallel to that axis. Radiation bank 21A comprises spatially periodic groups of radiation stripes A, C and E oriented along the x-axis. Radiation bank 21B contains groups G, I, and K of radiation stripes which are oriented along the y-axis. Radiation bank 21C contains groups B, D and F of radiation stripes oriented along the x-axis. Radiation bank 21D contains groups H, J, and L of radiation stripes which are oriented along the y-axis.

The embodiment of FIG. 5 shows radiation banks 21 each having three spatially-periodic groups of radiation stripes with each radiation stripe made up of a plurality of RED's 11. In general, radiation banks 21 may comprise any number of groups of radiation stripes and each radiation stripe may incorporate any radiation source. The use of individual RED's 11 to form the radiation stripes facilitates compact switch geometries. In alternative embodiments, such as the embodiment of FIG. 3, other radiation sources, such as liquid crystal light valves illuminated by conventional light sources, may be used to implement the individual radiation stripes.

Figure 6:
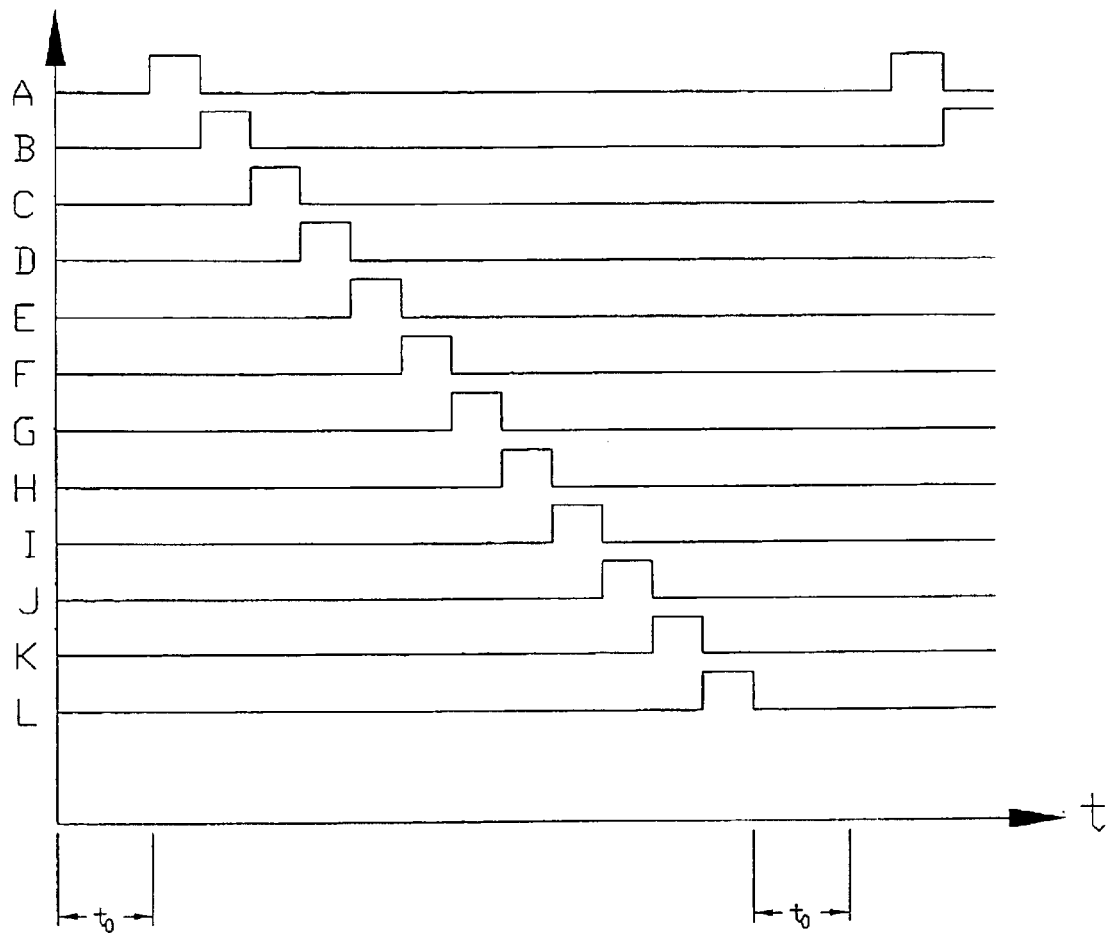
FIG. 6 shows a timing diagram indicating the time division multiplexing of control signal pulses from the various phases.

A controller causes each group of radiation stripes (A through L) to generate pulses of radiation. Radiation signals (A through L) from the pulsing of radiation stripes (A through L) are referred to as "phases" herein. In preferred embodiments, the pulses of phases (A through L) are multiplexed in time. A possible sequence for pulsing phases A through L is depicted in FIG. 6. The timing of the pulses may be controlled by a central clock signal, which is available on both "sides" of the switch. Thus, when controller 47 receives a signal indicating the intensity of radiation detected at a photodetector 24 at a specific time (see FIG. 7), controller 47 can use the central clock signal to associate that intensity with a particular phase (A through L). Periodically, for example, after each phase (A through L) has been pulsed once, there is a period $t_o$ where no phases are pulsed. Period $t_o$ may be used to measure background ambient light levels for use in normalizing the measured intensities of phases (A through L).

In this disclosure, the letters (A through L) are used to designate: groups of radiation stripes; optical control signals emitted by the radiation stripes; and electronic signals measured when the optical control signals are sensed by photodetectors 24.

Controller 47 receives timing information from the central system clock. Using this timing information and the electronic signals from photodetector 24, controller 47 is able to separately detect the intensity of radiation from each phase (A through L) that is transmitted through reticle 30. Controller 47 can determine the two dimensional position of reticle 30 (and fiber end 12') from the measured intensities for the different phases and known properties of reticle 30.

Figure 11:
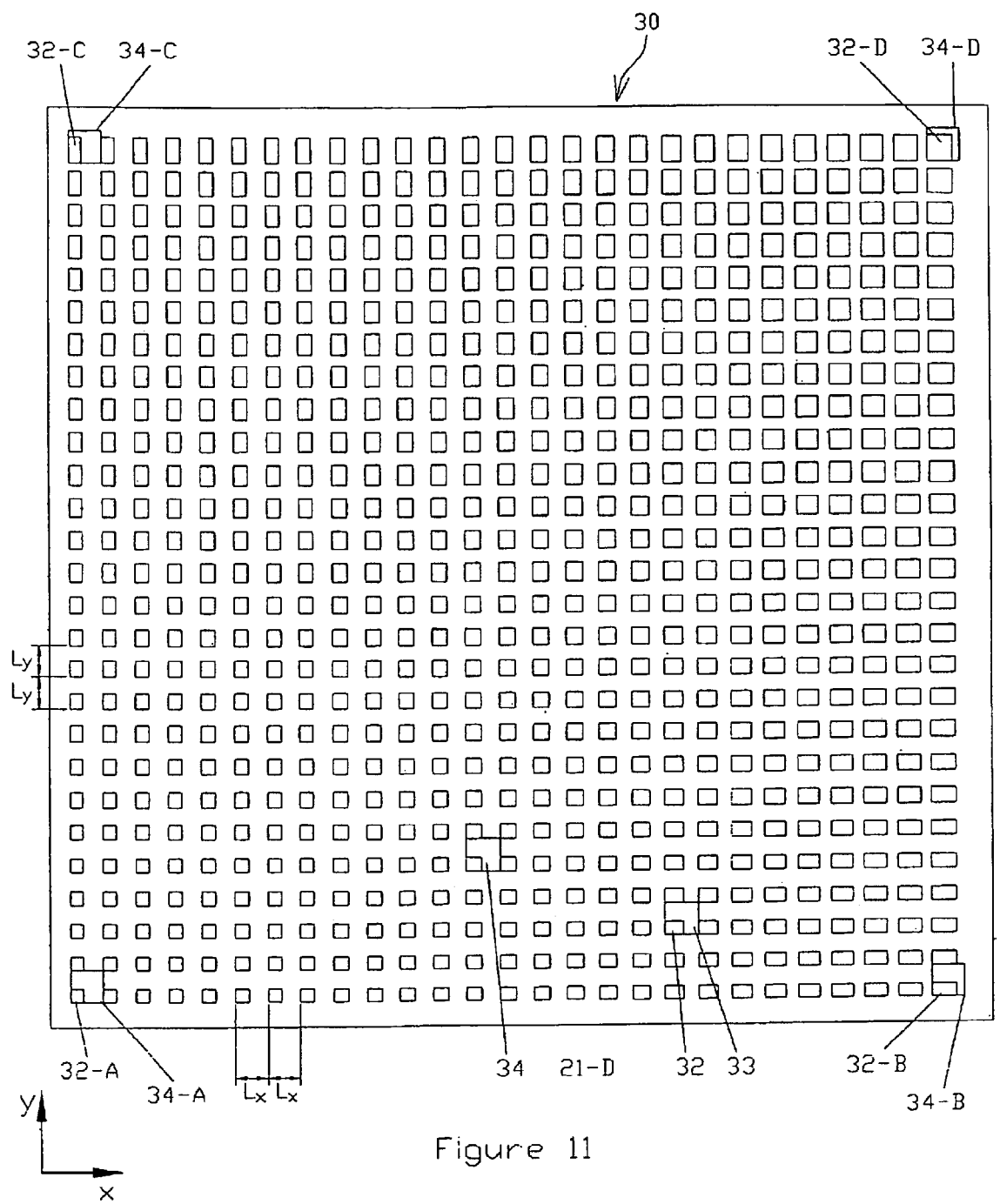
FIG. 11 depicts a reticle for use with a two dimensional encoder according to the invention.

FIG. 11 depicts reticle 30, which may be used in a position measurement system to provide absolute positional information about the location of a fiber end 12'. Reticle 30 is a two-dimensional reticle with axes labelled x and y. Each cell 34 of reticle 30 has two distinct regions, a substantially transparent aperture 32 and an opaque or non-transmissive region 33. Each cell 34 of reticle 30 has a length $L_x$ on the x-axis (referred to herein as the "pitch" in the x direction) and a length $L_y$ on the y-axis (referred to herein as the "pitch" in the y direction). Every cell 34 has the same pitches $L_x$ and $L_y$. It is convenient to make pitches $L_x$ and $L_y$ equal. Pitches $L_x$ and $L_y$ may differ from one another.

Figure 12:
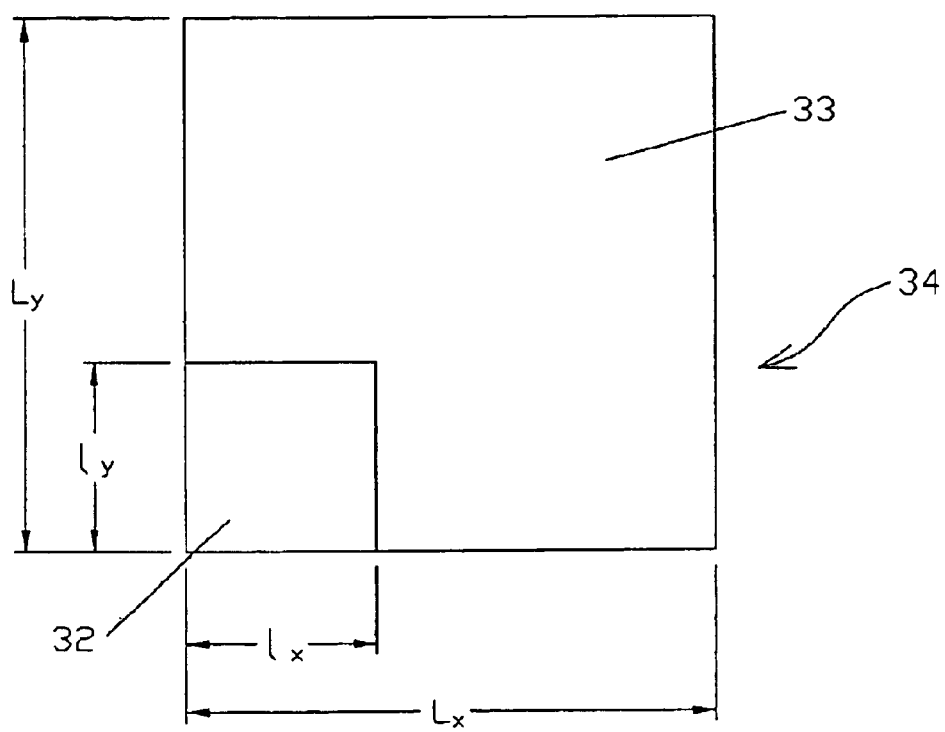
FIG. 12 is a magnified view of a single cell in the reticle of FIG. 11.

FIG. 12 depicts a single cell 34 of reticle 30. Cell 34 has an aperture 32 dimensioned $l_x$ by $l_y$. The remainder 33 of cell 34 is opaque. FIG. 12 arbitrarily displays a cell 34 with the aperture 32 in its bottom left hand corner. The choice of cellular construction depicted in FIG. 12 is not unique in that other cellular constructions can be envisaged.

The aperture duty cycle of reticle 30 varies along each of the x and y axes. "Aperture duty cycle" is the fraction of the area ($A=L_xL_y$) of a cell 34 occupied by aperture 32 and may be calculated as follows:

$$\text{aperture duty cycle} = (l_xl_y)/(L_xL_y) \quad (1).$$

In a currently preferred embodiment, $$l_x = L/3 + n_xL/(3N_x) \; n_x = 0, 1, 2, \ldots N_x \quad (2)$$

$$l_y = L/3 + n_yL/(3N_y) \; n_y = 0, 1, 2, \ldots N_y \quad (3)$$

where $N_x$ and $N_y$ are respectively the numbers of cells in the x and y dimensions of reticle 30 and $n_x$ and $n_y$ are respectively integer indices of the cell number in the x and y dimensions respectively. Indices $n_x$ and $n_y$ uniquely identify a particular cell 34 of reticle 30.

Although the variation of $l_x$ and $l_y$ in preferred embodiments of the invention is described by equations (2) and (3), adherence to these equations is not a requirement. All that is required to determine the absolute position of fiber end 12', is that there is a known relationship between the dimension $l_x$ and the index $n_x$ and the dimension $l_y$ and the index $n_y$, so that knowledge of the aperture duty cycle can be used to calculate the indices $n_x$ and $n_y$. The simple relationships of equations (1), (2) and (3) facilitate relatively simple determination of the position of fiber end 12'.

In FIG. 11 the four corner cells (34A, 34B, 34C and 34D) of reticle 30 demonstrate the variation of the aperture duty cycle. In cell 34A, aperture 32A is dimensioned such that $l_x=(\frac{1}{3})L_x$ and $l_y=(\frac{1}{3})L_y$, yielding an aperture duty cycle of $\frac{1}{9}$. In the illustrated embodiment, the aperture dimension $l_x$ varies linearly along the x-axis of reticle 30 from $l_x=(\frac{1}{3})L_x$ in cell 34-A to $l_x=(\frac{2}{3})L_x$ in cell 34-B. As a result, cell 34-B has an aperture duty cycle of $\frac{2}{9}$. Similarly, the dimension $l_y$ varies linearly from $l_y (\frac{1}{3})L_y$ in cell 34A to $l_y=(\frac{2}{3})L_y$ in cell 34C, yielding an aperture duty cycle of $\frac{2}{9}$ in cell 34C. In cell 34D, $l_x=(\frac{2}{3})L_x$ and $l_y=(\frac{2}{3})L_y$, for an aperture duty cycle of $\frac{4}{9}$.

Figure 13:
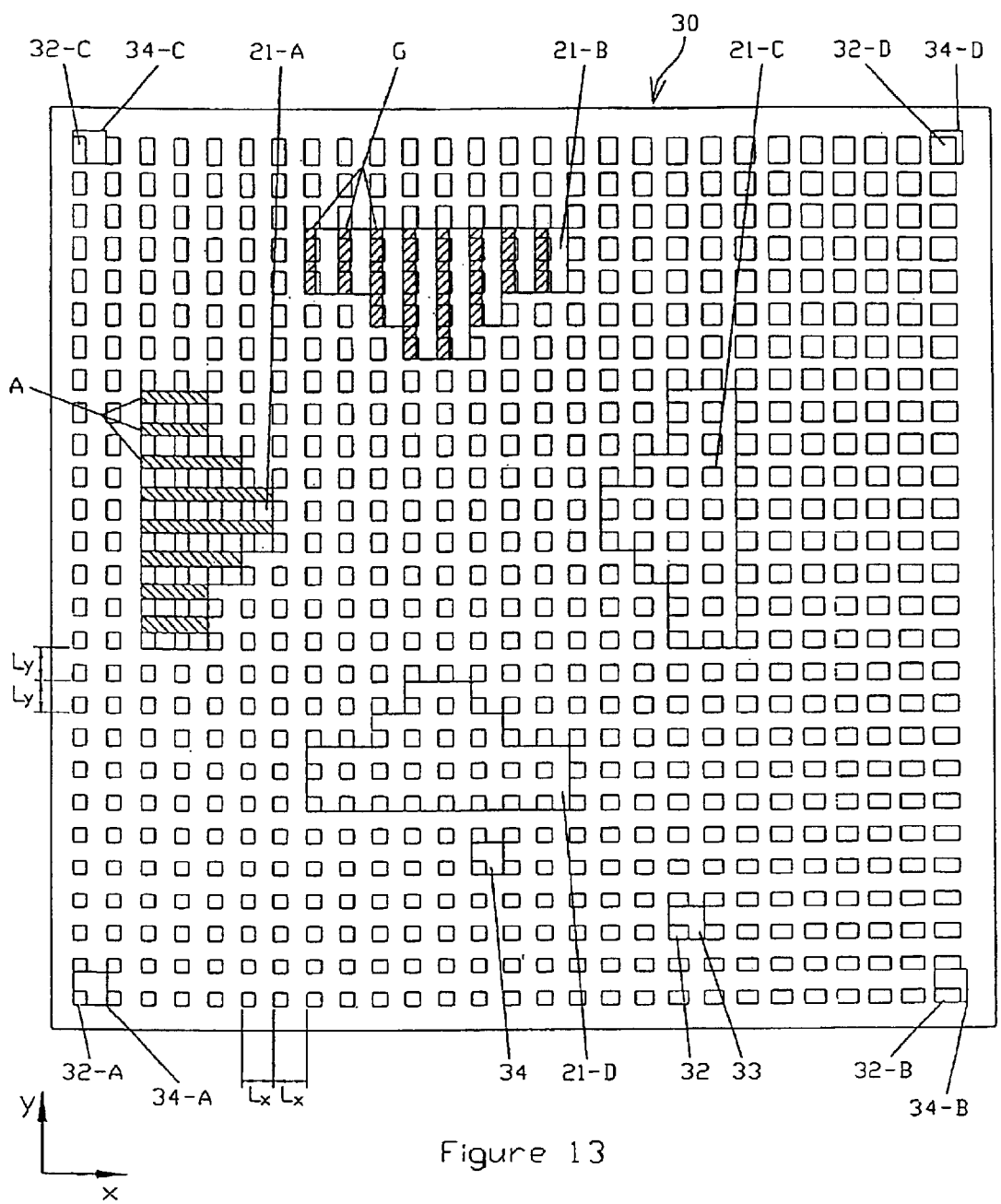
FIG. 13 shows the reticle of FIG. 11 with images of radiation banks projected onto it.

As shown in FIGS. 5, 7 and 13, lens 25 projects patterns of the radiation emitted by radiation banks 21 onto reticle 30. FIG. 13 depicts outlines of the images of radiation banks 21 on reticle 30. During each phase (A through L), a spatially-periodic pattern of radiation is imaged onto reticle 30. In the illustrated embodiment, during each phase the pattern consists of a group of spatially-periodic stripes. Where the pulsing of phases (A through L) is multiplexed in time, only the image of one of the phases (A through L) is projected onto reticle 30 at any given time. FIG. 13 illustrates the locations at which the stripes of phase A from radiation bank 21A and phase G from radiation bank 21B (shown shaded in FIG. 13) will be projected onto reticle 30 when reticle 30 is in a particular position. The particular positions of images of phases (A through L) of radiation banks 21 on reticle 30 depend upon the current location of reticle 30, which moves with fiber end 12'.

In preferred embodiments of the invention, the image of each individual radiation stripe on reticle 30 is rectangular and has an elongated axis and a shorter axis. Radiation banks 21-A and 21-C comprise radiation stripes oriented along the x-axis. Radiation banks 21B and 21D comprise radiation stripes oriented along the y-axis.

In preferred embodiments of the invention each radiation bank 21 comprises three groups of stripes each of which can be pulsed together. The stripes are projected onto reticle 30, such that the image of each stripe on reticle 30 has a length along its elongated axis that is equal to an integral number of cellular pitches and a width along its short axis that is equal to $\frac{1}{3}$ of a cellular pitch.

In preferred embodiments of the invention, images of stripes of each phase (A through L) are spatially periodic with a spatial period equal to the cellular pitch. For example, as illustrated by the image of phase A (see FIG. 13), the image of phases A through F each comprises a group of stripes that are periodic along the y-axis, with a spatial period equal to the cellular pitch $L_y$ of reticle 30. Similarly, as illustrated by the image of phase G (see FIG. 13), the images of phases G through L each comprises a group of stripes that are periodic along the x-axis, with a spatial period equal to the cellular pitch $L_x$ of reticle 30. Consequently, the images on reticle 30 of individual radiation stripes of a phase (A through L) occupy the same spatial phase in adjacent cells. For example, FIG. 13 shows that the individual radiation stripes in the image of phase A occupy the same spatial phase (i.e. y-position) within neighbouring rows of cells.

The projection of each spatially-periodic phase (A through L) onto reticle 30 creates a Moiré effect.

Any radiation from phases (A through L) that is transmitted through reticle 30 is collected by light pipe 43 (see FIG. 7) and directed onto photodetector 24, which produces electronic signals in proportion to the intensity of the transmitted radiation. Controller 47 uses timing information to de-multiplex the signals and uniquely determine the radiation intensity for the individual phases (A through L). Controller 47 samples the electronic intensity from each phase (A through L) and uses the sampled signals to calculate the position of the reticle 30.

The signals measured by photodetector 24 may be normalized to remove the effects of stray radiation and intensity differences between individual REDs 11. As shown in FIG. 2, extra normalization photodetectors 27 may be located where they can detect the full intensity of each phases (A through L) from an opposing radiation bank 21. Since the signals measured by normalization photodetectors 27 are not blocked by reticle 30, they may be referred to as "absolute intensities" of phases (A through L). In the illustrated embodiment, signals from four photodetectors 27 are averaged to derive the "absolute intensity" of each phase (A through L). Other types and arrangements of normalization photodetectors could also be used.

Normalization may involve subtracting an offset from each phase (A through L) to account for background stray radiation that may be measured by photodetectors 24 (see FIG. 7). The amount of the offset may be determined by the signal produced by the photodetector 24 during periods $t_0$ when none of phases (A through L) is emitting radiation (see FIG. 6). The period $t_0$ may be adjusted in duration or interleaved in various ways with the pulsing of phases (A through L). In the alternative to determining a separate offset for each switching unit 22, an average offset could be used for all of a group of switching units 22. This is not preferred.

A second step of normalization involves determining a ratio of each phase signal A through L to the corresponding absolute intensity for the phase as measured by normalization photodetector(s) 27.

In the following discussion of position determination it is assumed that the signals representing intensities from phases (A through L) have been normalized.

The absolute position of reticle 30 may be determined in two steps. A coarse position determining step determines the position of reticle 30 to within the area of a particular cell 34. A subsequent fine position determining step determines the position of reticle 30 within the cell 34 identified by the coarse position determining step.

A method for determining the position of reticle 30 will be explained with reference to FIGS. 14A and 14B, which depict a simplified implementation of the invention having only two radiation banks 21A and 21B. Radiation bank 21A has three radiation stripes (A, B and C) oriented along the x-axis. Radiation bank 21B has three radiation stripes (G, H and I) oriented along the orthogonal y-axis. The phases (A through I) of radiation banks 21A and 21B each comprise one radiation stripe. FIG. 14B depicts the locations at which the phases (A through I) of radiation banks 21A and 21B are projected on reticle 30.

Reticle 30 is constructed as described above and has a plurality of cells 34 having a constant pitch $L_x$ in the x direction and $L_y$ in the y direction and a variable aperture duty cycle.

Figure 15:
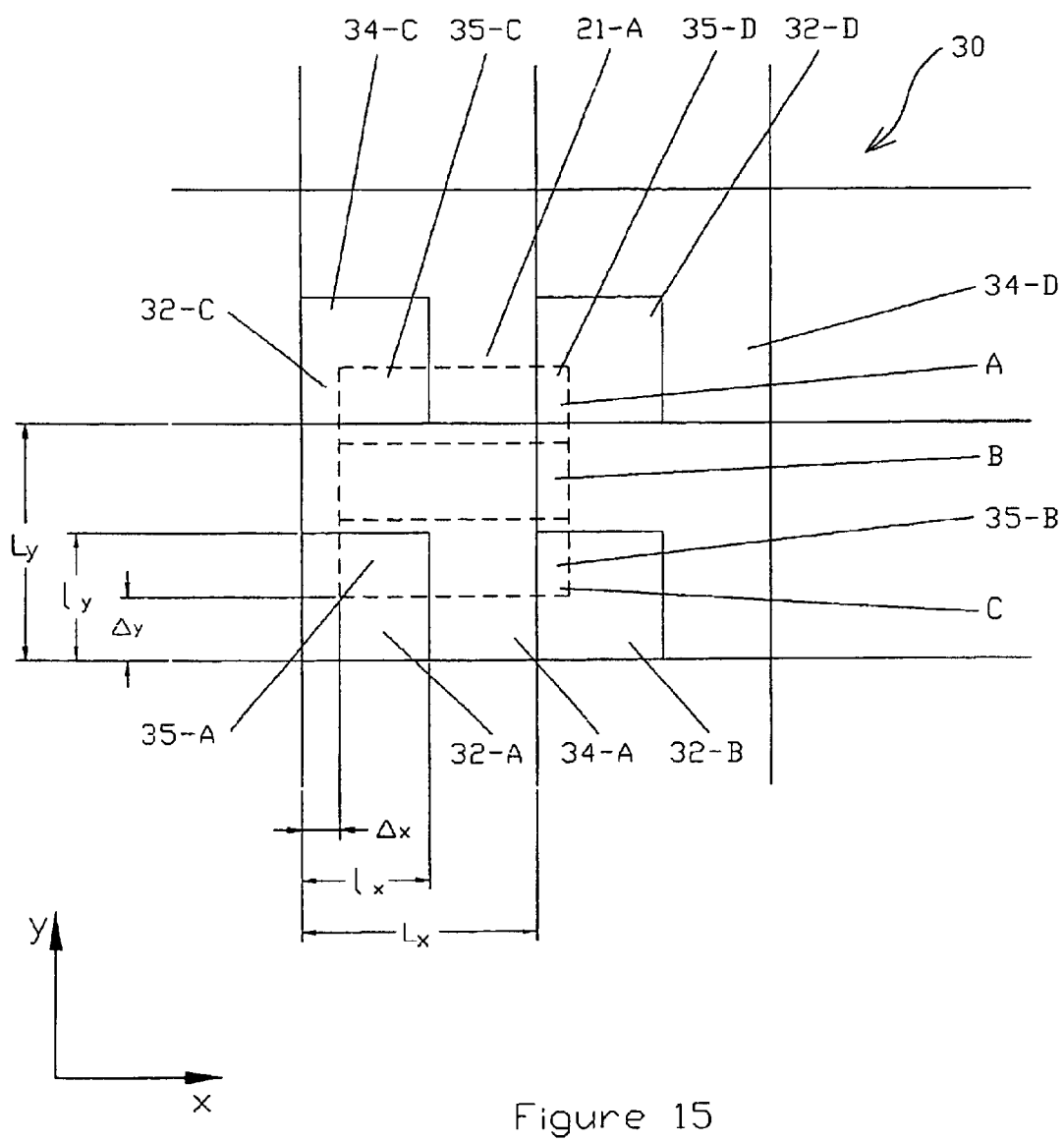
FIG. 15 shows the image of one of the simplified radiation banks of FIG. 14 on a reticle.

In the embodiment of FIG. 14B, the image of each radiation bank on reticle 30 has the same size as one of cells 34. FIG. 15 is a close-up view of the image of radiation bank 21A on reticle 30. Because the dimensions of the image of radiation bank 21A are $L_x$ by $L_y$ (i.e. the same as the cellular pitch of reticle 30), the image of radiation bank 21A overlaps a maximum of four cells. In FIG. 15, the image of radiation bank 21A overlaps cells (34A, 34B, 34C and 34D). The image of radiation bank 21A may overlap the apertures (32A, 32B, 32C and 32D) in as many as four cells 34. In FIG. 15, the areas where the image of the radiation bank 21A overlaps apertures (32A, 32B, 32C and 32D) are designated 35A, 35B, 35C and 35D respectively.

A photodetector 24 (not shown in FIG. 15) measures the intensity of transmitted radiation from each phase A, B and C and produces a corresponding electronic signal, which is sampled and normalized as described above. It can be seen from FIG. 15 that the signal from phase A will be proportional to the sum of areas 35C and 35D. Similarly, the signal from phase C will be proportional to the sum of the areas 35A and 35B. There will be no appreciable signal from phase B, since the image of phase B lies completely on opaque areas of reticle 30. The sum of the signals corresponding to all three phases A, B and C is proportional to the sum of the areas (35A, 35B, 35C and 35D) where the image of the radiation bank 21A overlaps apertures (32A, 32B, 32C and 32D) of reticle 30.

If the sum of the signals transmitted through reticle 30 from each radiation stripe (A, B and C) is designated $I_1$, then:

$$I_1 \propto A_1 = A_{35A} + A_{35B} + A_{35C} + A_{35D} \approx (l_y - \Delta_y)(l_x - \Delta_x) + \Delta_x(l_y - \Delta_y) + \Delta_y(l_x - \Delta_x) + \Delta_x \Delta_y \quad (4)$$

where $l_x$ and $l_y$ are the dimensions of aperture 32-A and $\Delta_y$ and $\Delta_x$ represent the displacement (in both dimensions) of the image of radiation bank 21-A from the corner of cell 34-A. In general, equation (4) will hold true, provided that:

$$l_y - L_y < \Delta_y < l_y \quad (5a)$$

and $$l_x - L_x < \Delta_x < l_x \quad (5b)$$

When equation (4) is expanded and the like terms collected, it can be reduced to:

$$A_1 \approx l_y l_x \quad (6)$$

The approximation in equation (6) arises because of the variation in the size of neighbouring apertures 32.

If $L_x = L_y = L$ and cell 34A has the indices $n_x = n_{x1}$ and $n_y = n_{y1}$, then equations (2) and (3) may be substituted into equation (6) to yield:

$$A_1 = \left(\frac{1}{3}L\right)^2 \left(1 + \frac{n_{xl}}{N_x}\right)\left(1 + \frac{n_{yl}}{N_y}\right) \quad (7)$$

Radiation bank 21-B comprising phases (G, H and I) will cause the photodetector to produce similar electronic signals to those of radiation bank 21-A. The controller may normalize those signals and generate a signal $I_2$ for radiation bank 21B in a manner similar to the determination of $I_1$ for radiation bank 21A. If the image of radiation bank 21B overlaps a cell 34 indexed by $n_x = n_{x2}$ and $n_y = n_{y2}$. It can be seen from FIG. 14-B that $n_{y2} = n_{y1} = n_y$ and $n_{x2} = n_{x1} + N_d$, where $N_d$ is a known quantity that represents the distance between the image of radiation bank 21-A and the image of radiation bank 21-B as measured in the number of cellular pitches $L_x$. Thus, for signal $I_2$ from radiation bank 21-B, equation (7) may be rewritten:

$$A_2 = \left(\frac{1}{3}L\right)^2 \left(1 + \frac{n_{xl}}{N_x} + \frac{N_d}{N_x}\right)\left(1 + \frac{n_y}{N_y}\right) \quad (8)$$

The difference between signals $I_1$ and $I_2$, is:

$$A_2 - A_1 = \left(\frac{1}{3}L\right)^2 \left(\frac{N_d}{N_x}\right)\left(1 + \frac{n_y}{N_y}\right) \quad (9)$$

In equation (9) all of the quantities are known with the exception of $n_y = n_{y1}$. Consequently, equation (9) may be solved for $n_{y1}$ and then the value of $n_{y1}$ may be substituted into equation (7) to solve for $n_{x1}$. As a result, indices $n_{x1}$ and $n_{y1}$ are known and the absolute coarse position of reticle 30 is determined to within cell 34A that has the indices $n_{x1}$ and $n_{y1}$.

Equations (5a) and (5b) represent the mathematical boundaries of cell 34A. If $\Delta_y$ or $\Delta_x$ falls outside of the range of equations (5a) or (5b), then controller 47 will determine the coarse position of reticle 30 to be in an adjacent cell. The construction of cells with apertures in their lower left-hand corners is convenient for discussion of the invention, but is not required.

Controller 47 may be programmed to use a predetermined look-up table to directly identify the coarse position from the measured values of $I_1$ and $I_2$, without having to perform significant calculations for each measurement.

There are many computational techniques that can be employed by a controller to derive the coarse position from the measurements of various phases and other information that may be available to the controller. The invention should be understood to cover any such techniques. Other information available to the controller may include information about the current or previous fine position measurements, the current or previous coarse position measurements and other data, such as calibration information and system specific information.

The above description of the preferred embodiment contemplates an absolute position measurement system 210 that determines the absolute coarse position of fiber end 12'. This absolute positional measurement involves determining the coarse position of fiber end 12' without requiring reference information, such as a start position of fiber end 12' or a reference signal. Although absolute position measurement is a preferred embodiment of the invention contemplated in this disclosure, the disclosure should be understood to include relative coarse position measurement. For example, a reticle could be used with a constant pitch on two dimensions and a non-varying aperture duty cycle. In such a case, fiber end 12' could start from a reference position and the controller could simply count the number of cells that fiber end 12' travels from the reference position in each dimension. Such a technique would still be capable of providing the coarse position of fiber end 12'.

Figure 16:
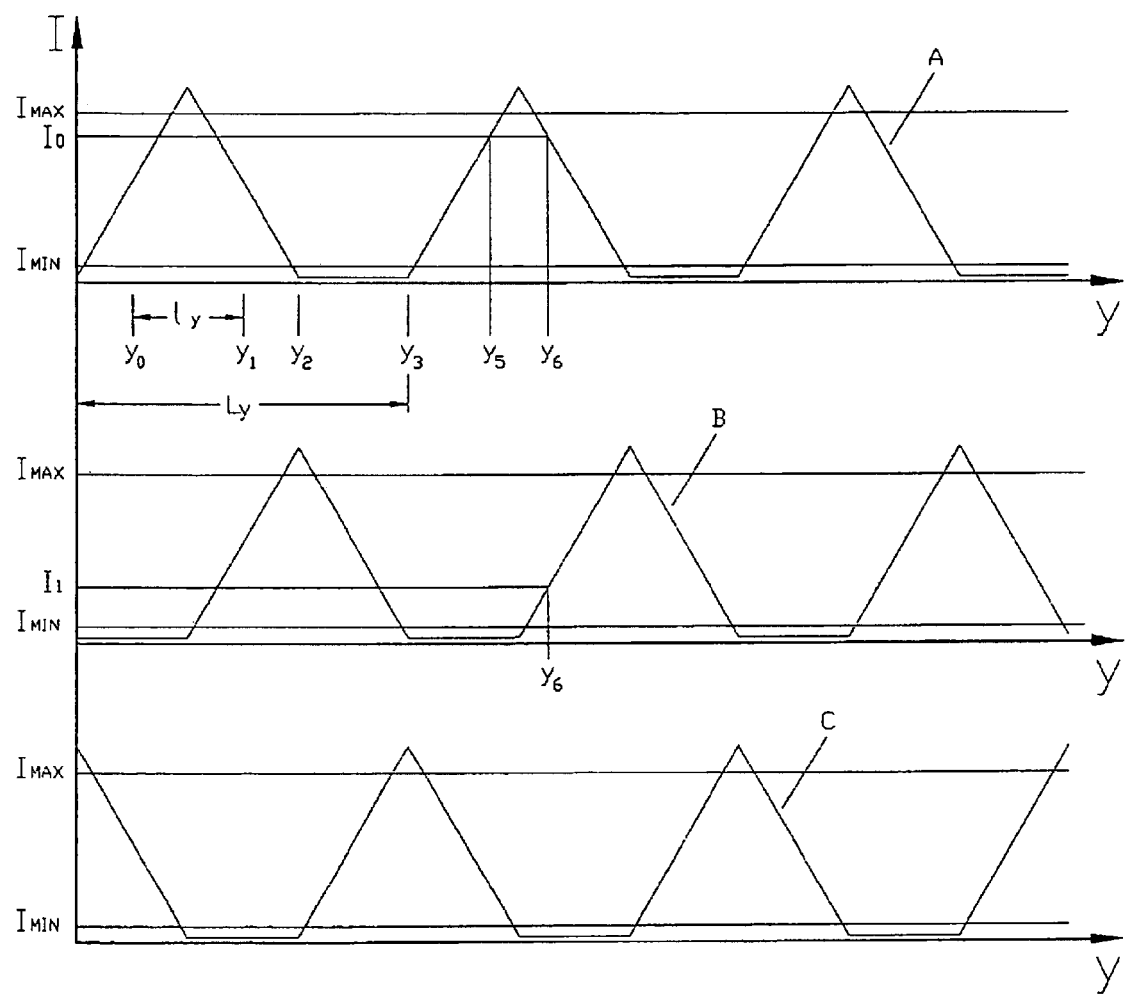
FIG. 16 depicts a spatial variation of the measured intensity signals associated with each of the three phases in one of the radiation banks.

The intensity of radiation from phases (A through I), which passes reticle 30 may also be used to determine the fine position of reticle 30 and fiber end 12' within a cell 34 identified by a coarse position measurement. FIG. 16 depicts ideal normalized intensity signals from phases (A, B and C) for the simplified embodiment of FIG. 14 as a function of the displacement of reticle 30 in the y direction. On the signal corresponding to phase A, the portion of the signal between $y_0$ and $y_1$ represents displacements for which the image of radiation stripe A directly overlaps an aperture 32 having a y-dimension $l_y$. The portion of the signal between $y_2$ and $y_3$, represents displacements for which the image of radiation stripe A overlaps completely an opaque area 33 of reticle 30. Consequently, the intensity of phase A is near zero for such displacements.

The period of each phase (A, B and C) is equal to the pitch Ly of reticle 30 on the y-axis. The duty cycle of each phase (A, B and C) varies slightly as reticle 30 is displaced in the y-direction. The variation in duty cycle of the signals (A, B and C) is a result of the variation of the aperture duty cycle on reticle 30. If the coarse position is known, measurement of an intensity $I_o$ for phase A is not certain to uniquely identify the fine position of reticle 30. For example, at displacements $y_5$ or $y_6$, the intensities for phase A are both equal to $I_o$. This ambiguity can be resolved by using information from another phase (B or C). For example, if phase A is measured to have intensity $I_o$ and phase B is measured to have intensity $I_1$ then the fine position of the reticle 30 on the y-axis is determined to be at $y_6$.

In some circumstances, measurement of a particular phase (A, B or C) may yield a result where the signal is in the zero-derivative range (i.e. at a peak) or in the region where the signal is in a flat region (i.e. phase A in the region between $y_2$ and $y_3$). Such a measurement may yield an indeterminate result, because the direction of movement cannot be concluded from the measurement of that particular phase. If phase A was measured and determined to be in such a state, then one of the other phases (B or C) may be used as the principal phase to determine the fine position. A simple way to determine whether a first measured phase is in an indeterminate range is to compare the measured intensity of the first measured phase to thresholds, such as $I_{max}$ and $I_{min}$. For example, if the intensity of phase A is measured to be above $I_{max}$ or below $I_{min}$, then the controller may use phase B or C as the principal phase to determine the fine position. With aperture duty cycles that range from ⅓ to ⅔, at least one of the three phases (A, B or C) will be within the range between $I_{min}$ and $I_{max}$ and, therefore, sensitive to small changes in position.

Phases (G, H and I) may be used to determine a fine position of reticle 30 on the x-axis in a substantially similar manner. To ensure that the encoder can measure fine position on both axes, radiation banks 21A and 21B of the embodiment of FIG. 14 have the elongated axes of their respective radiation stripes (A, B and C) and (G, H and I) oriented in orthogonal directions.

Figure 17:
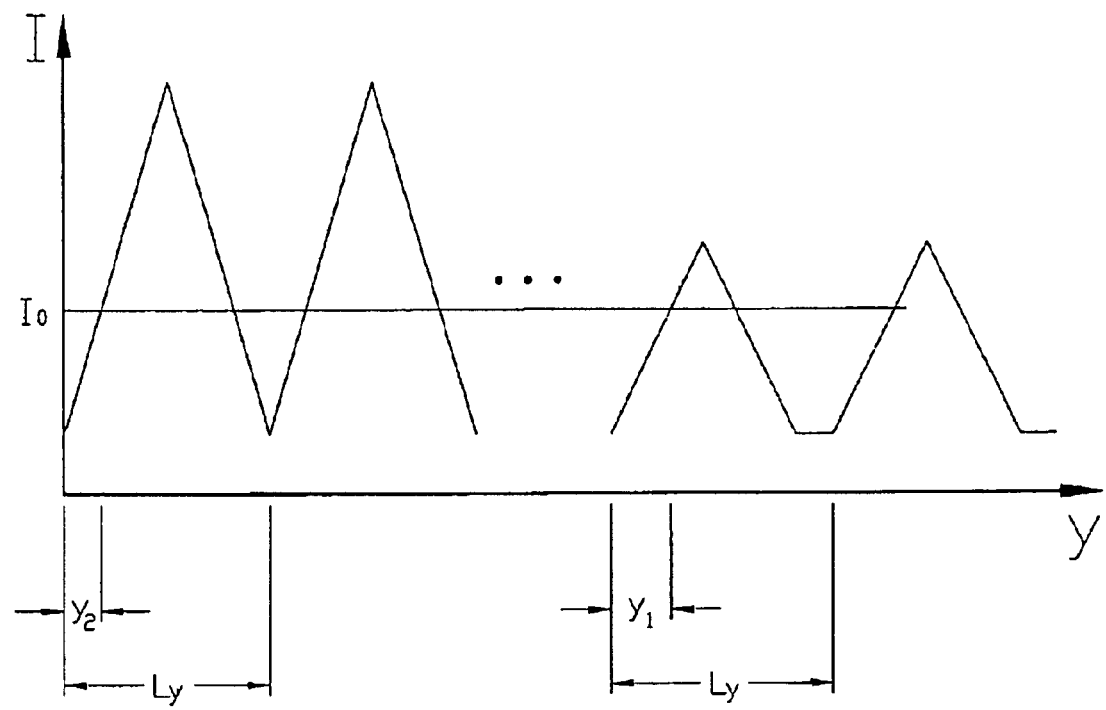
FIG. 17 depicts the spatial variation of a particular phase in one of the radiation banks in two distinct regions of the reticle.

Due to the variation in aperture duty cycle across reticle 30, the intensity of a given phase signal varies differently with small displacements for different coarse positions. This difference is depicted in FIGS. 17A and 17B, which illustrates several periods of a given phase signal in two regions of the reticle 30 with distinctly different aperture duty cycles. It can be seen that a given intensity $I_o$ corresponds to a different position within the cell depending on the aperture duty cycle of that particular cell. When the aperture duty cycle is approximately ⅓ (as in FIG. 17-B), a given intensity $I_o$ corresponds to a fine position $y_1$ within the cell, but when the aperture duty cycle is approximately ⅔ (as in FIG. 17A), the same intensity $I_o$ corresponds to a different fine position $y_2$ within the cell.

This variation in aperture duty cycle may be accommodated by providing a separate fine position look-up table for each cell. The coarse position may be used to identify a look-up table to be used in determining fine position.

Practically speaking, in a given switch implementation, it is known that movement of fiber end 12' is only required to be within a predetermined range, which depends on the switch geometry and the number of switching units 22 on the other "side" of the switch. Consequently, the controller can employ an "average" look-up table to determine an approximate fine position. For example, if the switch requires a range of movement of fiber end 12' that is approximately 20 pitches of reticle 30 in any given direction, then a look-up table comprising the average of a signal in those particular 400 cells may be used to determine an approximate fine position. This approximation technique allows a significant reduction in controller resources (i.e. speed, instruction cycles and memory). The use of the average look-up table to calculate an approximate fine position is independent of the actual cell in which the fine position is being determined. For this reason, the average look-up table technique has another advantage in that it does not require knowledge of the coarse position and may be employed concurrently (or prior to) the coarse position calculation.

In some instances (depending on controller resources and calculation time available), it may be suitable or advantageous to combine the average look-up table technique with the individual look-up table technique. A combination of these two techniques involves using the average look-up table first, to determine an approximate fine position. This initial procedure enables a rapid calculation of the approximate fine position. The coarse position may be determined as set out above. After the coarse position measurement locates reticle 30 to a particular cell, the fine position can be determined more accurately using a look-up table corresponding to that particular cell.

The preferred embodiment depicted in FIGS. 2, 5 and 13, differs from the simplified embodiment of FIG. 14 in that:
more radiation banks are provided (e.g. four radiation banks 21-A, 21-B, 21-C and 21-D);
Each phase comprises a spatially-periodic group of radiation stripes (e.g. each phase (A through L) comprises either 5 or 6 stripes); and,
The area covered on reticle 30 by the imaged phases is larger.

Adding radiation banks and increasing sizes of the images of the radiation banks on reticle 30 improves performance by providing data, which can be used to reduce the effects of any rotation of reticle 30, shadow from fiber 12 or the fact that RED's 11 may be round and therefore may produce images on reticle 30 that are not ideal stripes.

For example, having third and fourth radiation banks facilitates measurement of rotation of reticle 30. As shown in FIG. 5, radiation banks 21A and 21C both comprise radiation stripes having elongated axes oriented in the x direction. Thus, phases from either one of radiation banks 21A or 21C may be used as described above to measure the fine position of reticle 30 on the y-axis. Rotation of reticle 30 may be measured by comparing y-axis positions determined using information from the phases of both radiation banks 21A and 21C. If the fine position measured by radiation bank 21-A is different from that measured by radiation bank 21-C, then reticle 30 must be in a rotated position relative to radiation banks 21A through 21D.

If the difference in the fine position determined using the signals from radiation banks 21A and 21C is $\delta_y$ and the separation between the images on reticle 30 of radiation banks 21A and 21C is $N_d$, then the angular rotation $\theta$ of reticle 30 in radians can be determined according to:

$$\theta = \sin^{-1}(\delta_y/N_d) \approx \delta_y/N_d \quad (10)$$

In addition to measuring rotation, the larger size and larger number of the radiation banks in the preferred embodiment provide extra light intensity and a larger area of coverage on the surface of reticle 30. The additional light and area of coverage improve the signal to noise ratio of the position measurement system 210, which helps to overcome the practical difficulties associated with discrete RED sources and the shadow of fiber 12. In addition, the larger size and larger number of radiation banks 21 in the preferred embodiment help to reduce the effects of surface defects, such as lithographic imperfections and impurities on reticle 30.

The images on reticle 30 of radiation banks 21 in the embodiment of FIGS. 2, 5 and 13 are equal in area to two or more cells 34. The intensity of the sum of the signals from a given radiation bank 21 is determined by the area of the apertures of the cells covered by that radiation bank image. If the area of the image of each radiation bank 21 on reticle 30 is equal to the area of an integral number of cells, then this total aperture area will be approximately constant for a range of about one pitch in each direction. For example, the sum of the phases (A, C and E) from the image of radiation bank 21-A will be approximately constant for a range of up to one pitch in each direction. As described in above for the simplified embodiment of FIGS. 14 and 15 having two or more radiation banks 21 facilitates the calculation of the coarse position based on information available from the phases from each such radiation bank 21. An algebraic calculation of the coarse position for the preferred embodiment with the four larger radiation banks 21 as depicted in FIGS. 2, 5 and 13 may be done according to the same principles used for the simplified embodiment of FIGS. 14 and 15. As long as the images on reticle 30 of the radiation stripes of each phase are spatially-periodic in the manner described above, then the calculation of the fine position is exactly the same in the preferred embodiment as it is in the simplified embodiment. Practically, however, it is easier to calculate the fine position in the preferred embodiment, because the signal to noise ratio can be considerably improved.

There are many possible variations of this invention. Without limitation, some of these variations provide alternative structures for a reticle. For example a reticle (not shown) may have periodic variations of aperture duty cycle on each of the x and y axes. Such a reticle is said to have multiple "chirps". For example, the dimensions of the apertures of such a reticle could have two chirps on each dimension as described by the equations (2') and (3'):

$l_x = L/3 + 2n_x L/(3(N_x-2))$ for $n_x = 0, 1, 2, \ldots (N_x/2-1)$; and $l_x = L/3 + 2L(n_x - N_x/2)/(3N_x)$ for $n_x = (N_x/2), (N_x/2+1), \ldots N_x$  (2')

$l_y = L/3 + 2n_y L/(3(N_y-2))$ for $n_y = 0, 1, 2, \ldots (N_y/2-1)$; and $l_y = L/3 + 2L(n_y - N_y/2)/(3N_y)$ for $n_y = (N_y/2), (N_y/2+1), \ldots N_y$  (3')

Embodiments incorporating reticles with multiple chirps, such as the one described by equations (2') and (3'), can provide greater variation in aperture duty cycle as between adjacent cells. In this manner, it is easier for the coarse position measurement system to distinguish between immediately adjacent cells on the reticle.

In order to implement an absolute position measurement encoder using a multiple chirp reticle it is necessary to determine the chirp that the reticle presently occupies. This extra information can be obtained from a number of sources, including prior knowledge of the absolute position, the drive conditions imparted on the actuation system and a prediction of the resultant movement of the reticle. In addition, external reference sources of radiation may be used to indicate which chirp the reticle presently occupies.

Reticle 30 does not need to have cells arranged in a rectangular grid, but could have other layouts which produce Moiré interference patterns when radiation patterns are projected onto the reticle. One such embodiment has a reticle pattern as shown in FIG. 19A, wherein the reticle 99 is made up of concentric annuluses of opaque material 98. In this embodiment, the layout of radiation banks 21 may remain as a series of orthogonal radiation stripes (see FIG. 5). This arrangement of radiation banks 21 still generates a Moiré interference pattern when projected and imaged onto circularly patterned reticle 99.

A particular advantage in the embodiment of FIG. 19A is that the fiber measurement system becomes rotationally symmetric and it is no longer necessary to measure the angular rotation of reticle 99.

Circularly symmetrical reticle 99 also provides absolute positional information over two dimensions, since the modulation level of the various phases (A through L) remains dependent on the location at which the various phases (A through L) are imaged onto the surface of reticle 99. In some positions, the images of phases (A through L) alone will not be determinative of the absolute position. In such a scenario, controller 47 may still be able to resolve the absolute position of fiber end 12' based on prior knowledge of the absolute position, the drive conditions imparted on the actuation system and/or a prediction of the resultant movement of reticle 99.

In the circularly symmetrical embodiment of FIG. 19, the contrast, for phases (A through L), between the lowest signal intensity and the highest signal intensity (i.e. the "modulation depth") will be less than the corresponding modulation depth of the preferred implementation, where both reticle 30 and radiation stripes are oriented in orthogonal straight lines. It is possible, however, to compensate for the lower modulation depth of phases (A through L) by employing more (or higher intensity) REDs 11, to yield higher overall phase signal intensity and correspondingly higher signal to noise ratio at photodetector 24.

Improved performance can be obtained from circularly oriented reticle 99, when it is used in combination with a layout of radiation banks that is somewhat different than that of FIG. 5. In the case of reticle 99, it is advantageous to have the radiation banks, the radiation stripes and the corresponding RED's uniformly distributed, to ensure that Moiré interference is produced for all positions at which the radiation banks are imaged onto the surface of reticle 99. One such radiation bank 97 is shown in FIG. 19B. In FIG. 19B, control signal REDs 11 are arranged in a grid and the multiplexing circuitry is designed such that REDs 11 can be pulsed to create radiation stripes 96A that are oriented in the x-axis direction (i.e. rows of REDs 11) or radiation stripes 96B oriented in the y-axis direction (i.e. columns of REDs 11). Because the radiation stripes are pulsed in synchronization with the system clock, the phases can still be easily extracted by photodetectors 24 and their associated controllers on the opposing side of the switch. In the layout of FIG. 19B, it is relatively easy to increase the overall light level of the Moiré interference pattern by simply increasing the number of control signal RED's 11 that are employed.

In the embodiments of FIGS. 5 and 13, "y-axis radiation banks" 21A and 21C have radiation stripes are responsible for the measurement of the fine position on the y-axis and "x-axis radiation banks" 21B and 21D are responsible for measuring the fine position on the x-axis. It is desirable to avoid cross-coupling of control signal modulation on the x and y axes. Ideally, the radiation reaching photodetector 24 from y-axis radiation banks 21A and 21C would be unaffected by displacements of reticle 30 along the x-axis. However, because of discrete RED radiation sources 11 and the variation in size of adjacent apertures on the x-axis of reticle 30, there is a small amount of modulation of phases (A through F) from y-axis radiation banks 21A and 21C that results from movements of the reticle 30 along the x-axis. Similarly, radiation from phases (G through L) of x-axis radiation banks 21B and 21D may be undesirably modulated by movement of reticle 30 along the y-axis. This undesirable "coupling" or "cross-coupling" may be compensated for in software. The cross-coupling of control signal pahses can also be reduced or eliminated by using different embodiments of the radiation banks and the reticle.

In a first embodiment designed to reduce the cross-coupling of control signals, RED's 11 for different radiation banks have different wavelengths. In addition, this embodiment uses a reticle similar to that of FIG. 11, but fabricated such that the reticle lines in the direction of the x-axis are made of a material that is opaque to only a first one of the control signal wavelengths, but not the other. The reticle lines in the direction of the y-axis are opaque to the other control signal wavelength, but not to the first control signal wavelength. This embodiment decouples the measurement of the reticle position on the x-axis from the measurement of the reticle position on the y-axis and improves the signal to noise ratio of the position measurement system.

A convenient choice for the different wavelengths is 940 nm and 830 nm, although it should be appreciated that many choices are available and the selection is based on convenient availability of RED sources 11, the spectral response of photodetector 24 and the availability of coating materials, which may be used to make the reticle lines that will selectively block one or the other wavelength.

Figure 20:
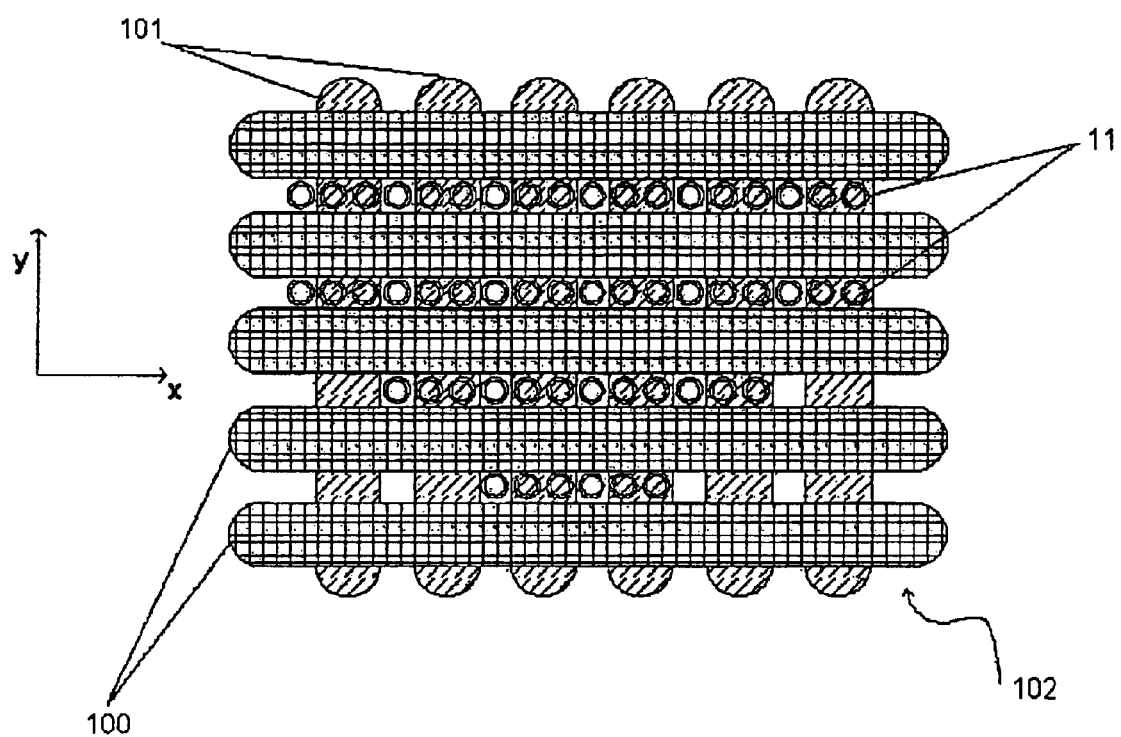
FIG. 20 depicts the image of a radiation bank and its associated RED's on the surface of a dual wavelength reticle.

The operation of the dual wavelength system can be explained with reference to FIG. 20. The image of a pattern of control signal REDs 11 from a particular y-axis radiation bank is shown superimposed over the reticle 102 as it would be if REDs 11 were imaged onto reticle 102 of a particular switching unit (not shown). For purposes of the discussion of this alternative embodiment, it is convenient to assume that control signal REDs 11 of this particular y-axis radiation bank have a wavelength of 940 nm. Reticle 102 is comprised of lines 100 oriented along the x-axis and lines 101 oriented along the y-axis. Lines 101 are opaque to radiation at 940 nm and transmit radiation at 830 nm, while the lines 100 are opaque to radiation at 830 nm and transmit radiation at 940 nm. FIG. 20 shows that the number of control signal REDs 11 that are transmitted by reticle 102 to illuminate photodetector 24 is increased considerably over the previously disclosed embodiments. This increase is a result of the transparency of lines 101 oriented on the y-axis to the radiation of the REDs 11 at $\lambda$=940 nm. In the previously disclosed embodiments, more radiation from control signal REDs 11 was blocked by the opaque lines of the reticle 30 oriented on the y-axis. The increase in the number of detectable control signal REDs 11 for the dual wavelength embodiment represents a significant gain in the intensity of the control signals at the surface of photodetector 24.

While reticle 102 in FIG. 20 is shown with regularly spaced lines (100 and 101), it could also be fabricated with a variation in the aperture duty cycle.

The arrangement of FIG. 20 has the added advantage that movements of reticle 102 in the x and y directions are decoupled from one another. Referring to FIG. 20 (and recalling the assumption that RED's 11 therein depicted are at $\lambda$=940 nm), it can be seen that, because of the transparency of lines 101 to radiation at $\lambda$=940 nm, a movement of the reticle 102 along the x-axis direction has no effect on the control signal transmission. Similarly (although not shown), when RED's from an x-axis radiation bank are imaged onto the surface of the reticle 102, such control signal radiation will not vary with position of reticle 120 in the y-axis direction.

A dual wavelength reticle 102 may be made by a two-step lithography process or by fabricating the required lines on two separate substrates and bonding them together, for example.

In yet another variation of the previously described embodiments designed to decouple the x and y movements, different polarizations (rather than different wavelengths) can be utilized for each of the x-axis and y-axis radiation banks. In such an embodiment, the y-axis radiation banks (21A and 21C) can have a polarizing material placed in front of their REDs 11, which transmits only light of a single polarization to be projected onto the reticle. An orthogonally oriented polarizing material is placed in front of the x-axis radiation banks (21B and 21D), so as to transmit radiation of orthogonal polarity onto the reticle. In a manner similar to that of the dual wavelength reticle 102 (see FIG. 20), the reticle in the dual polarization embodiment is patterned with selectively transmitting lines of polarizing material that transmit certain polarities and block orthogonal polarities. In this manner, the control signals for the measurement of the x-axis and y-axis positions can be independently extracted without the undesirable coupling effect. This dual polarization embodiment allows the use of a single wavelength control signal RED 11.

As will be appreciated by those versed in the art of optics, the invention disclosed here, while described in terms of a preferred embodiment based on the use of optical fibers, applies directly also to other carriers of optical beams. In this disclosure, therefore, the phrases "fiber" and "optical fiber" should be understood to include such general carriers, conduits and channels capable of carrying optical beams. In the case of an optical fiber, the end of the fiber optically behaves like the combination of a lens and an optical aperture. In a more general case, therefore, the invention applies equally well to sets of opposed optical apertures through which emerge optical beams to be switched from any given one of the input apertures to any one of the output apertures. As with the ends of fibers manipulated by actuators in the case of the preferred embodiment, each input and output channel, in this more general alternative embodiment, is provided with an arrangement of optical elements positioned behind the associated aperture. The arrangement of elements, or an element in the arrangement, is manipulated to direct the beams between input and output apertures. Specifically a micro-machined electrostatic mirror (MEMS) device may be employed to direct the beam. In this alternative embodiment a reference pattern is kept in fixed spatial relation to the relevant directing element.

The above descriptions of the simple and preferred embodiments are intended for illustrative purposes only, and are not intended to limit the scope of the present invention in any way. Those skilled in the art will appreciate that various modifications can be made to the embodiments discussed above without departing from the spirit of the present invention.

The above described embodiment of reticle 30 having a variable aperture duty cycle is useful for determining the absolute position of fiber end 12'. However, a reticle having both constant pitch and constant aperture duty cycle can be used to implement a position measurement system that discerns the relative position of fiber end 12' (i.e. relative to some reference position). The invention should be understood to incorporate such embodiments.

Although the preferred embodiment discloses radiation banks having three groups of radiation stripes (i.e. three phases) in each radiation bank 21, the number of phases in each radiation bank 21 is not limited to three. The invention should be understood to incorporate schemes having different numbers of phases in each radiation bank 21, provided that the images of the radiation stripes meet the size and periodicity criteria outlined above. In addition, the individual radiation stripes need not be comprised of REDs. Generally, any light source that can be shaped into a geometry able to approximate the size and periodicity criteria discussed in this disclosure may be used to form the radiation stripes and the radiation banks.

Although advantageous, the embodiment depicted in FIG. 7 is not unique. There are many embodiments capable of measuring the individual radiation signals from each phase (A through L). For example, the technique of the preferred embodiment involves multiplexing the phases (A through L) in time and then measuring them using a single photodetector 24. However, an alternative embodiment involves continuously active radiation signals from each radiation bank 21 or each phase (A through L) and a plurality of photodetectors, each photodetector shaped and aligned, so as to only receive signals from a particular radiation bank 21 or a particular phase (A through L). Another alternative embodiment involves using different wavelengths of radiation for each phase (A through L) and having distinct wavelength sensitive photodetectors or band pass filters corresponding to each phase (A through L). The invention should be understood to incorporate any means of uniquely measuring the radiation signals from each phase (A through L). It will be appreciated, however, that the preferred embodiment using time division multiplexing of phases (A through L) and a single photodetector has the inherent advantage of being able to be produced with relatively inexpensive "off the shelf" type components. Although the radiation banks 21 described above represent a particular embodiment of the present invention, there are other embodiments used in particular circumstances that may prove to be advantageous.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An optical cross-connect switch for switching optical communications signals, the switch comprising:

a first pattern projector configured to project one or more first control signal radiation patterns;

a plurality of output optical channels;

a plurality of output encoders, each output encoder associated with one of the plurality of output optical channels, each output encoder positioned, relative to the associated output optical channel and the first pattern projector, to receive the one or more first control signal radiation patterns and to detect at least a portion of one or more corresponding output Moiré interference patterns produced by the one or more first control signal radiation patterns;

wherein each output encoder is configured to generate a corresponding output control signal indicative of an intensity of detected output Moiré interference patterns;

wherein each output encoder comprises an associated output reticle, each output reticle having a spatially varying pattern of interaction with radiation incident thereon.

2. A switch according to claim 1 wherein each output reticle is positioned to receive the one or more first control signal radiation patterns and to produce the one or more corresponding output Moiré interference patterns in response thereto.

3. A switch according to claim 2 wherein each output encoder comprises an associated output radiation sensor, each output radiation sensor positioned to detect at least a portion of the one or more corresponding output Moiré interference patterns and configured to generate the corresponding output control signal.

4. A switch according to claim 3 comprising:

a second pattern projector configured to project one or more second control signal radiation patterns;

a plurality of input optical channels;

a plurality of input encoders, each input encoder associated with one of the plurality of input optical channels, each input encoder positioned, relative to the associated input optical channel and the second pattern projector, to receive the one or more second control signal radiation patterns and to detect at least a portion of one or more corresponding input Moiré interference patterns produced by the one or more second control signal radiation patterns;

wherein each input encoder is configured to generate a corresponding input control signal indicative of an intensity of detected input Moiré interference patterns.

5. A switch according to claim 4 wherein each input encoder comprises an associated input reticle, each input reticle having a spatially varying pattern of interaction with radiation incident thereon.

6. A switch according to claim 5 wherein each input reticle is positioned to receive the one or store second control signal radiation patterns and to produce the one or more corresponding input Moiré interference patterns in response thereto.

7. A switch according to claim 6 wherein each input encoder comprises an associated input radiation sensor, each input radiation sensor positioned to detect at least a portion of the one or more corresponding input Moiré interference patterns and configured to generate the corresponding input control signal.

8. A switch according to claim 7 comprising a controller connected to receive the input and output control signals, the controller configured to determine a position of each output reticle based on the corresponding output control signal and configured to determine a position of each input reticle based on the corresponding input control signal.

9. A switch according to claim 3 comprising a controller connected to receive the output control signals, the controller configured to determine a position of each output reticle based on the corresponding output control signal.

10. A according to claim 3 wherein each of the output reticles has a spatially varying transmissivity and each associated output radiation sensor is located to detect radiation from the one or more first control signal radiation patterns that has passed through the associated output reticle.

11. A switch according to claim 3 wherein each of the output reticles has a spatially varying reflectivity and each associated output radiation sensor is located to detect radiation from the one or more first control signal radiation patterns that has reflected from the associated output reticle.

12. A switch according to claim 3 wherein each output reticle is patterned with a regular array of cells.

13. A switch according to claim 12 wherein each of the cells comprises an aperture portion and an opaque portion and wherein each output reticle passes a first proportion of the first control signal radiation patterns incident on the aperture portion to the associated output radiation sensor and each output reticle passes a second proportion, smaller than the first proportion, of the first control signal radiation patterns incident on the opaque portion to the associated output radiation sensor.

14. A switch according to claim 12 wherein each of the one or more first control signal radiation patterns comprises s spatially periodic radiation pattern having a period substantially equal to a spatial periodicity of the cells on the output reticles.

15. A switch according to claim 14 wherein the cells on the output reticles are arranged in rows extending substantially parallel to a first axis and columns extending substantially parallel to a second axis and each of the one or more first control signal radiation patterns comprises elongated stripes which are oriented substantially parallel to one of the first and second axes.

16. A switch according to claim 3 wherein each output reticle comprises a circularly symmetric pattern of aperture areas and opaque areas and wherein each output reticle passes a first proportion of the first control signal radiation patterns incident on the aperture areas to the associated output radiation sensor and each output reticle passes a second proportion, smaller than the first proportion, of the first control signal radiation patterns incident on the opaque areas to the associated output radiation sensor.

17. A switch according to claim 3 wherein each of the one or more first control signal radiation patterns comprises a plurality of elongated stripes of radiation.

18. A switch according to claim 3 wherein each of the one or more first control signal radiation patterns comprises a spatially periodic radiation pattern.

19. A switch according to claim 3 wherein the one or more first control signal radiation patterns comprise at least one radiation pattern having a first wavelength and at least one radiation pattern having a second wavelength.

20. A switch according to claim 3 wherein the first pattern projector comprises an array of first radiation emitting devices located in positions optically opposing the plurality of output optical channels.

21. A switch according to claim 20 wherein the first pattern projector is configured to project the one or more first control signal radiation patterns by turning on selected pluralities of the first radiation emitting devices.

22. A switch according to claim 3 wherein each output encoder comprises an associated output lens, each output lens located to focus the one or more first control signal radiation patterns onto the associated output reticle.

23. A switch according to claim 22 wherein each output lens is also located to couple an optical communication signal from a selected one of a plurality of input optical channels into the associated output optical channel.

24. A switch according to claim 3 wherein each output reticle is coupled to move with the associated output optical channel, and wherein the one or more corresponding output Moiré interference patterns vary in intensity based on a position of the associated output reticle.

25. A switch according to claim 24 wherein the output optical channels comprise optical fibers.

26. A switch according to claim 3 wherein each output reticle is coupled to move with an associated moveable optical element, and wherein the one or more corresponding output Moiré interference patterns vary in intensity based on a position of the associated output reticle.

27. A switch according to claim 26 wherein a position of each moveable optical element influences an optical path of an optical communication signal coupled into the associated output optical channel.

28. A switch according to claim 27 comprising a controller connected to receive the output control signals from the output radiation sensors, the controller configured to determine a position of each moveable optical element based on the corresponding output control signal.

29. A switch according to claim 3 comprising a plurality of output actuators, each output actuator associated with one off the plurality of output optical channels and each output actuator comprising: a magnetic member coupled to move with the associated output optical channel and a plurality of magnetically polarizable branches spaced apart around the magnetic member.

30. A switch according to claim 29 wherein each magnetic member is circularly symmetric.

31. A switch according to claim 29 wherein each magnetic member comprises a ring of magnetic material.

32. A switch according to claim 31 wherein each ring extends around a peripheral edge of the associated output reticle.

33. A switch according to claim 29 wherein each output actuator comprises four branches equally spaced apart around the magnetic member.

34. An optical cross-connect switch according to claim 1 wherein each output optical channel comprises an optical fiber, wherein each reticle is coupled to move with a corresponding one of the optical fibers, wherein the first pattern projector is configured to project first and second control signal radiation patterns onto all of the reticles, and wherein each output encoder comprises a radiation sensor associated with its reticle, each radiation sensor located to generate a control signal indicative of an intensity of radiation of the first and second control signal radiation patterns which has interacted with its associated reticle.

35. An optical switch according to claim 34 comprising a data processor connected to receive the control signal from each of the radiation sensors and configured to compute a position of the associated reticle from the control signal.

36. An optical switch according to claim 35 wherein each reticle is patterned with a regular array of cells.

37. An optical switch according to claim 36 wherein each of the cells comprises an aperture portion and an opaque portion and wherein each reticle passes a first proportion of radiation incident on the aperture portion from the pattern projector to the associated radiation sensor and each reticle passes a second proportion, smaller than the first proportion, of the radiation incident on the opaque portion from the pattern projector to the associated radiation sensor.

38. An optical switch according to claim 36 wherein the first and second radiation patterns comprise spatially periodic patterns having periods equal to a spatial periodicity of the cells.

39. An optical switch according to claim 38 wherein the cells are arranged in rows extending substantially parallel to a first axis and columns extending substantially parallel to a second axis and the first and second radiation patterns respectively comprise elongated stripes oriented substantially parallel to the first and second axes.

40. An optical switch according to claim 35 wherein the interaction between each reticle and the first radiation pattern creates an associated first Moiré interference pattern and wherein the radiation sensor associated with the reticle is located to detect an intensity of the associated first Moiré interference pattern and to generate the control signal in response thereto.

41. An optical switch according to claim 40 wherein the interaction between each reticle and the second radiation pattern creates an associated second interference pattern and wherein the radiation sensor associated with the reticle is located to detect an intensity of the associated second Moiré interference pattern and to generate the control signal in response thereto.

42. An optical switch according to claim 34 wherein each reticle has spatially varying transmissivity and the associated radiation sensor is located to detect radiation from the pattern projector which has passed through the reticle.

43. An optical switch according to claim 34 wherein each reticle has spatially varying reflectivity and the associated radiation sensor is located to detect radiation from the pattern projector which has been reflected from the reticle.

44. An optical switch according to claim 34 comprising a lens associated with each of the optical fibers, wherein each lens is located to focus the first and second radiation patterns onto the associated reticle.

45. An optical switch according to claim 44 wherein each lens is located to focus optical communication signals into an end of the associated optical fiber.

46. An optical switch according to claim 34 comprising an actuator associated with each of the plurality of optical fibers, each actuator comprising a magnetic member coupled to move with the associated optical fiber and a plurality of magnetically polarizable branches spaced apart around the magnetic member.

* * * * *